United States Patent
Shin et al.

(10) Patent No.: US 7,483,090 B2
(45) Date of Patent: Jan. 27, 2009

(54) LIQUID CRYSTAL DISPLAY HAVING FIRST AND SECOND SUBPIXEL ELECTRODES CONNECTED TO COUPLING ELECTRODE THROUGH RESPECTIVE CONTACT HOLES AND THIRD SUBPIXEL ELECTRODE SEPARATED FROM THE FIRST TWO BUT CAPACITIVELY COUPLED THERETO

(75) Inventors: Kyoung-Ju Shin, Yongin-si (KR); Chang-Hun Lee, Yongin-si (KR); Cheol-Woo Park, Suwon-si (KR); Chong-Chul Chai, Seoul (KR)

(73) Assignee: Samsung Electronics Co., Ltd. (KR)

( * ) Notice: Subject to any disclaimer, the term of this patent is extended or adjusted under 35 U.S.C. 154(b) by 338 days.

(21) Appl. No.: 11/189,835

(22) Filed: Jul. 27, 2005

(65) Prior Publication Data
US 2006/0028590 A1 Feb. 9, 2006

(30) Foreign Application Priority Data
Jul. 27, 2004 (KR) .................. 10-2004-0058709

(51) Int. Cl.
*G02F 1/1343* (2006.01)
(52) U.S. Cl. .................. 349/38; 349/39; 349/138; 349/144
(58) Field of Classification Search .................. 349/38, 349/39, 138, 144
See application file for complete search history.

(56) References Cited

U.S. PATENT DOCUMENTS

| | | | | |
|---|---|---|---|---|
| 5,734,449 | A * | 3/1998 | Jang .................. | 349/39 |
| 5,923,390 | A | 7/1999 | Jung Mok et al. | |
| 6,052,162 | A * | 4/2000 | Shimada et al. .................. | 349/38 |
| 6,100,954 | A * | 8/2000 | Kim et al. .................. | 349/138 |
| 6,407,791 | B1 | 6/2002 | Suzuki et al. | |
| 2002/0109813 | A1 * | 8/2002 | Yu et al. .................. | 349/141 |
| 2003/0206262 | A1 | 11/2003 | Kim et al. .................. | 349/129 |
| 2004/0125248 | A1 * | 7/2004 | Song .................. | 349/38 |
| 2004/0135147 | A1 | 7/2004 | Kim et al. .................. | 257/59 |

FOREIGN PATENT DOCUMENTS

EP 0 685 757 A2 12/1995

(Continued)

OTHER PUBLICATIONS

European Search Report for Application No. 05254679.3-2205; Dated Apr. 5, 2006.

*Primary Examiner*—David Nelms
*Assistant Examiner*—John S. Heyman
(74) *Attorney, Agent, or Firm*—Cantor Colburn LLP

(57) ABSTRACT

The invention provides a liquid crystal display including a thin film transistor array panel according to an embodiment of the present invention includes: a substrate; a gate line formed on the substrate; a data line crossing the gate line; a thin film transistor connected to the gate and data lines; and a pixel electrode including first and second subpixel portions electrically connected to the thin film transistor, and a third subpixel portion capacitively coupled to at least one of the first and the second subpixel portions. Such an arrangement of a TFT permits a distribution of the tilt directions of liquid crystal molecules in the same pixel to improve lateral viewing of the liquid crystal display.

23 Claims, 33 Drawing Sheets

FOREIGN PATENT DOCUMENTS

| | | |
|---|---|---|
| JP | 10186408 | 7/1998 |
| JP | 11038439 | 2/1999 |
| JP | 11109390 | 4/1999 |
| JP | 2000081636 | 3/2000 |
| JP | 2000155337 | 6/2000 |
| KR | 1999003712 | 1/1999 |
| KR | 100366081 | 12/2002 |
| KR | 100380141 | 4/2003 |
| KR | 100413512 | 12/2003 |
| KR | 100417917 | 1/2004 |

* cited by examiner

LIQUID CRYSTAL DISPLAY HAVING FIRST AND SECOND SUBPIXEL ELECTRODES CONNECTED TO COUPLING ELECTRODE THROUGH RESPECTIVE CONTACT HOLES AND THIRD SUBPIXEL ELECTRODE SEPARATED FROM THE FIRST TWO BUT CAPACITIVELY COUPLED THERETO

CROSS-REFERENCE TO RELATED APPLICATION

This application claims priority from Korean Patent Application No. 10-2004-0058709 that was filed in the Korean Intellectual Property Office on Jul. 27, 2004, the disclosure of which is incorporated in its entirety by reference herein.

BACKGROUND OF THE INVENTION

1. Field of the Invention

The present invention relates to a liquid crystal display and a panel therefor.

2. Description of the Related Art

A liquid crystal display (LCD) is one of the most widely used flat panel displays. An LCD may include two panels having field-generating electrodes, such as a common electrode and pixel electrodes, and a liquid crystal (LC) layer interposed therebetween. The LCD displays images by applying voltages to the field-generating electrodes to generate an electric field in the LC layer, which orients LC molecules in the LC layer to adjust polarization of incident light.

A vertical alignment (VA) mode LCD, which aligns LC molecules such that their longitudinal axes are perpendicular to the panels in absence of electric field, is often utilized because of its high contrast ratio and wide reference viewing angle.

The wide viewing angle of the VA mode LCD can be realized by providing cutouts and protrusions in the field-generating electrodes. The cutouts and protrusions can determine tilt directions of the LC molecules, which can be distributed into varying directions to widen the reference viewing angle.

Nevertheless, a typical VA mode LCD still has poor lateral visibility as compared with front visibility.

SUMMARY OF THE INVENTION

The invention provides a thin film transistor array panel that includes: a substrate; a first signal line formed on the substrate; a second signal line crossing the first signal line; a thin film transistor connected to the first and second signal lines; and a pixel electrode including a first subpixel portion and a second subpixel portion connected to the thin film transistor, and a third subpixel portion capacitively coupled to at least one of the first subpixel portion and the second subpixel portion.

The invention further provides a liquid crystal display panel that includes: a common electrode panel having a common electrode; a thin film transistor array panel disposed opposite the common the common electrode, which comprises a substrate, a first signal line formed on the substrate, a second signal line crossing the second signal line, a first thin film transistor connected to the first and the second signal lines, and a pixel electrode having a first electrode portion and a second electrode portion connected to the first thin film transistor, and a third portion capacitively coupled to at least one of the first and second subpixel portions; a liquid crystal layer disposed between the common electrode panel; and a second thin film transistor having a first subpixel including the first or second electrode portions to which a first voltage is applied and a second subpixel including the third electrode portion to which a second voltage is applied.

BRIEF DESCRIPTION OF THE DRAWINGS

The present invention will become more apparent by describing embodiments thereof in detail with reference to the accompanying drawings.

DETAILED DESCRIPTION OF EMBODIMENTS

Figure 1:
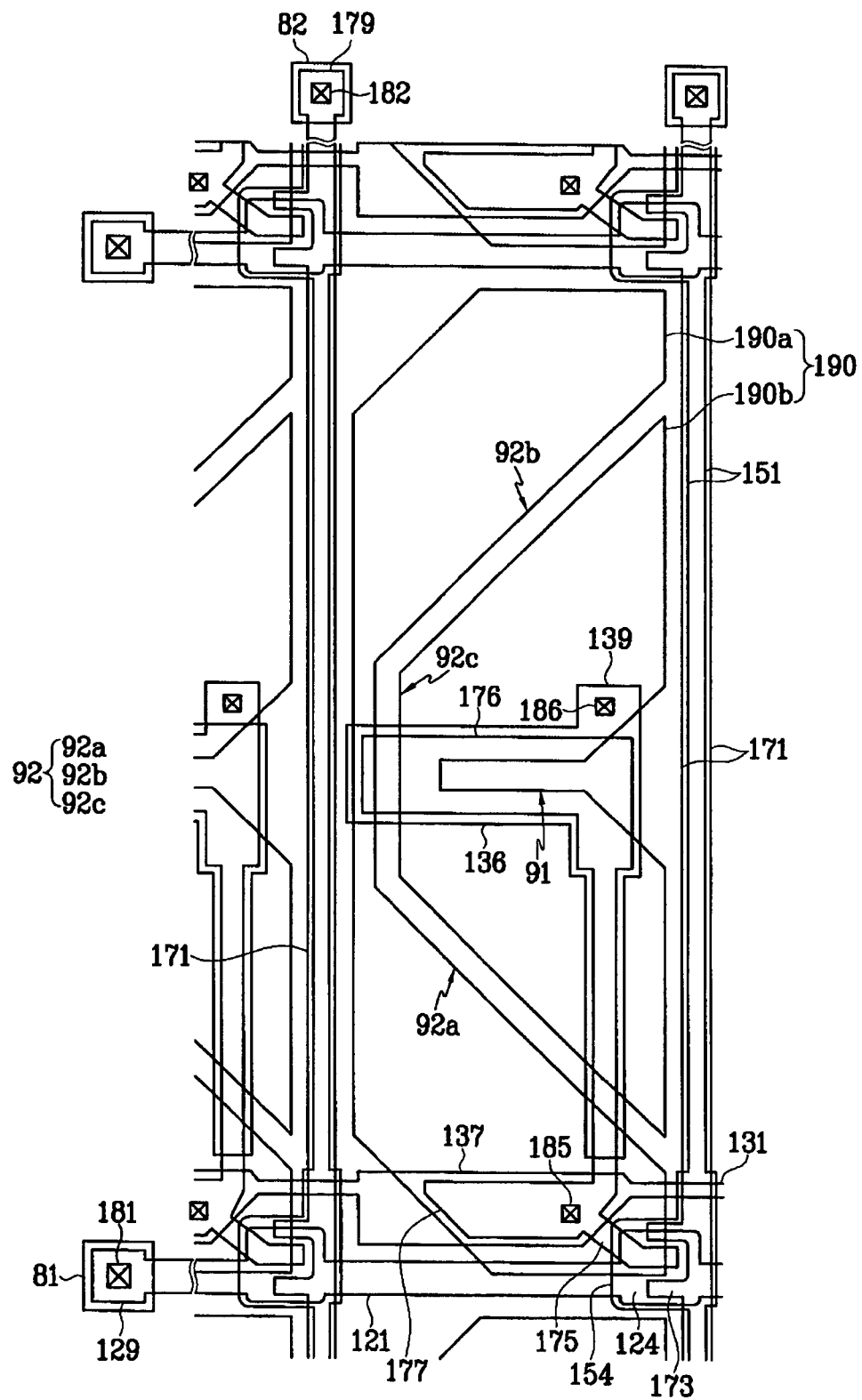
FIG. 1 is a layout view of a TFT array panel of an LCD according to an embodiment of the present invention.

The present invention now will be described more fully hereinafter with reference to the accompanying drawings, in which embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. The position of elements may be described in reference to their orientation in the figure, e.g. upward being towards the top of the figure. It will be understood that when an element such as a layer, film, region or substrate is referred to as being "on" another element, it can be directly on the other element or intervening elements may also be present. In contrast, when an element is referred to as being "directly on" another element, there are no intervening elements present.

Referring to FIG. 1, an LCD according to an embodiment of the present invention includes a TFT array panel 100, a common electrode panel 200, and an LC layer 3 interposed between the panels 100 and 200.

The TFT array panel 100 will be described in detail with reference FIG. 1, FIG. 3, and FIG. 4.

A plurality of gate conductors including a plurality of gate lines 121, a plurality of storage electrode lines 131, and a plurality of capacitive electrodes 136 are formed on an insulating substrate 110 such as transparent glass or plastic.

Gate lines 121 transmit gate signals and extend substantially in a transverse direction along a pixel. Each gate line 121 includes a plurality of gate electrodes 124 projecting upward and downward and an end portion 129 having a large area for contact with another layer or an external driving circuit. A gate driving circuit (not shown) for generating the gate signals may be mounted on a flexible printed circuit (FPC) film (also not shown), which may be attached to, directly mounted on, or integrated onto substrate 110. Gate lines 121 may extend to be connected to a driving circuit that can be integrated onto substrate 110.

Storage electrode lines 131 are supplied with a predetermined voltage and extend substantially parallel to the gate lines 121. Each of the storage electrode lines 131 is disposed between two adjacent gate lines 121 and may be closer to a lower one of the two adjacent gate lines 121. Each of the storage electrode lines 131 includes a plurality of storage electrodes 137 of a greater width expanding upward and downward.

Each of the capacitive electrodes 136, which are separated from the storage electrode lines 131, includes a wide transverse portion including a projection 139 protruding upward and a narrow longitudinal portion connected thereto. The transverse portion is a rectangle elongated substantially parallel to the adjacent two gate lines 121 and almost equidistant therefrom. The longitudinal portion extends from a right end of the transverse portion toward a storage electrode line 131.

Gate conductors 121, 131 and 136 are preferably made of a metal such as Al or an Al alloy, Ag or an Ag alloy, Cu or a Cu alloy, Mo or a Mo alloy, Cr, Ta, or Ti. The conductors may also have a multi-layered structure including two conductive films (not shown) having different physical characteristics. One of the two films preferably includes a low resistivity metal like Al, Ag, or Cu for reducing signal delay or voltage drop. The other film preferably includes a metal like Mo, Cr, Ta, or Ti, which has good physical, chemical, and electrical contact characteristics with other materials such as indium tin oxide (ITO) or indium zinc oxide (IZO). Examples of two film combinations are a lower Cr film and an upper Al (alloy) film or a lower Al (alloy) film and an upper Mo (alloy) film. As recognized by persons of ordinary skill in the art, however, gate conductors 121, 131 and 136 can be made of various metals or conductors.

The lateral sides of the gate conductors 121, 131 and 136 are inclined relative to a surface of the substrate 110, and such an inclination angle can range from about 30 degrees to 80 degrees.

A gate insulating layer 140, preferably made of either silicon nitride (SiNx) or silicon oxide (SiOx), is formed on gate conductors 121, 131 and 136.

A plurality of semiconductor stripes 151, preferably made of either hydrogenated amorphous silicon (abbreviated to "a-Si") or polysilicon, are formed on the gate insulating layer 140. Each semiconductor stripe 151 extends substantially in the longitudinal direction and widens near the gate lines 121 and the storage electrode lines 131 such that semiconductor stripes 151 cover large areas of gate lines 121 and storage electrode lines 131. Each semiconductor stripe 151 has a plurality of projections 154 branched out toward, gate electrodes 124.

A plurality of ohmic contact stripes and islands 161 and 165 are formed on the semiconductor stripes 151. Ohmic contact stripes and islands 161 and 165 can be made of, for example, n+ hydrogenated a-Si heavily doped with n type impurity such as phosphorous or silicide. Each ohmic contact stripe 161 has a plurality of projections 163, and the projections 163 and the ohmic contact islands 165 are located in pairs on the projections 154 of the semiconductor stripes 151.

The lateral sides of semiconductor stripes 151 and ohmic contacts 161 and 165 are inclined relative to the surface of the substrate 110, and these inclination angles can range from about 30 degrees to 80 degrees.

A plurality of data conductors including a plurality of data lines 171 and a plurality of drain electrodes 175 are formed on the ohmic contacts 161 and 165 and the gate insulating layer 140.

Data lines 171 transmit data signals and extend substantially in the longitudinal direction to cross gate lines 121 and storage electrode lines 131. Each data line 171 may include a plurality of source electrodes 173 projecting toward gate electrodes 124 and an end portion 179 having a large area for contact with another layer or an external driving circuit. A data driving circuit (not shown) for generating the data signals may be mounted on a FPC film (not shown), which may be attached to substrate 110 in a similar manner as the FPC film that is connected to gate lines 121 as described above.

Each of the drain electrodes 175 is separated from the data lines 171 and includes a narrow end portion disposed opposite source electrodes 173 with respect to the gate electrodes 124. The end portion of drain electrode 175 is partly enclosed by source electrode 173.

Each drain electrode 175 further includes an expansion 177 and a coupling electrode 176 connected thereto.

Expansion 177, which can be trapezoidal and elongated parallel to the gate lines 121, overlaps a storage electrode 137.

Coupling electrode 176 overlaps a capacitive electrode 136 of nearly the same shape. Coupling electrode 176 has a wide transverse portion as well as a longitudinal portion connected to the transverse portion and expansion 177 but does not overlap the projection 139 of the capacitive electrode 136.

Gate electrode 124, source electrode 173, and drain electrode 175 along with projection 154 of semiconductor stripe 151 form a TFT having a channel disposed in projection 154 that is located between source electrode 173 and the drain electrode 175.

Data conductors 171 and 175 are preferably made of refractory metal such as Cr, Mo, Ta, Ti, or alloys thereof. Data conductors 171 and 175, however, may have a multilayered structure including a refractory metal film (not shown) and a low resistivity film (not shown). Examples of the multi-layered structure are a double-layered structure including a lower Cr/Mo (alloy) film and an upper Al (alloy) film or a triple-layered structure of a lower Mo (alloy) film, an intermediate Al (alloy) film, and an upper Mo (alloy) film. As known to persons of ordinary skill in the art, however, data conductors 171 and 175 may be made of various metals or conductors.

Data conductors 171 and 175 may also have inclined edge profiles, and such angles thereof may range from about 30 degrees to 80 degrees.

Ohmic contacts 161 and 165, which are interposed only between the underlying semiconductor stripes 151 and the overlying data conductors 171 and 175 thereon, reduce the contact resistance between the adjacent underlying and overlying layer. Although semiconductor stripes 151 are narrower than data lines 171 at most places, semiconductor stripes 151 widens near the gate lines 121 as described above, to smooth the profile of the surface, thereby preventing the disconnection of data lines 171. Semiconductor stripes 151 include some exposed portions that are not covered with data conductors 171 and 175 such as those portions located between source electrodes 173 and drain electrodes 175.

Passivation layer 180 may include a lower passivation film 180p preferably made of inorganic insulator such as silicon nitride or silicon oxide and an upper passivation film 180q preferably made of organic insulator. The organic insulator preferably has dielectric constant less than about 4.0 and it may have photosensitivity and may provide a flat surface.

A plurality of color filters (not shown) may be disposed between the lower passivation film 180p and the upper passivation film 180p or may replace the upper passivation film 180q.

Passivation layer 180 has a plurality of contact holes 182 exposing end portions 179 of data lines 171 and a plurality of contact holes 185 exposing expansions 177 of drain electrodes 175. Passivation layer 180 and gate insulating layer 140 have a plurality of contact holes 181 exposing end portions 129 of gate lines 121 and a plurality of contact holes 186 exposing projections 139 of capacitive electrodes 136. Contact holes 181, 182, 185 and 186 may have inclined or stepped sidewalls that can be easily formed by using organic material.

A plurality of pixel electrodes 190 and a plurality of contact assistants 81 and 82, which are preferably made of transparent conductor such as ITO or IZO or reflective conductor such as Ag, Al, Cr, or alloys thereof, are formed on passivation layer 180.

Each pixel electrode 190 may be rectangular having chamfered left corners that are oblique to gate lines 121. Pixel electrodes 190 overlap gate lines 121 to increase the aperture ratio.

Each pixel electrode 190 has a gap 92 that divides pixel electrode 190 into outer and inner sub-pixel electrodes 190a and 190b.

Gap 92 may include oblique lower and upper portions 92a and 92b and a longitudinal portion connecting them. Lower and upper portions 92a and 92b extend from a right edge towards a left edge of pixel electrode 190. Longitudinal portion 92c connects left ends of the lower and the upper portions 92a and 92b.

Accordingly, the inner sub-pixel electrode 190b may be shaped like an isosceles trapezoid rotated at a right angle and the outer subpixel electrode 190a includes a pair of rightangled trapezoids rotated by a right angle and a longitudinal portion coupling the right-angled trapezoids, which can be considered upper and lower outer subpixel electrode portions.

Outer subpixel electrode 190a can be electrically connected to expansion 177 through contact hole 185.

Inner sub-pixel electrode 190b can be electrically connected to capacitive electrode 136 through contact hole 186 and overlaps a coupling electrode 176. Inner sub-pixel electrode 190b, capacitive electrode 136, and coupling electrode 176 form a "coupling capacitor."

Inner sub-pixel electrode 190b may have a cutout 91 extending in the transverse direction with an inlet at the right edge of the pixel electrode 190. The inlet has a pair of inclined edges substantially parallel to the lower and upper portion 92a and 92b of the gap 92.

Pixel electrode 190 is approximately symmetrical with respect to capacitive electrode 136. Individual portions 92a, 92b, and 92c of the gap 92 will be also referred to as cutouts hereinafter.

The number of the cutouts or the number of the partitions is varied depending on the design factors such as the size of pixel electrode 190, the ratio of the transverse edges and the longitudinal edges of the pixel electrode 190, and the characteristics of LC layer 3, for example.

Contact assistants 81 and 82 can be connected to end portions 129 of gate lines 121 and end portions 179 of data lines 171 through contact holes 181 and 182, respectively. Contact assistants 81 and 82 protect the end portions 129 and 179 and enhance the adhesion between end portions 129 and 179 and external devices.

Figure 2:
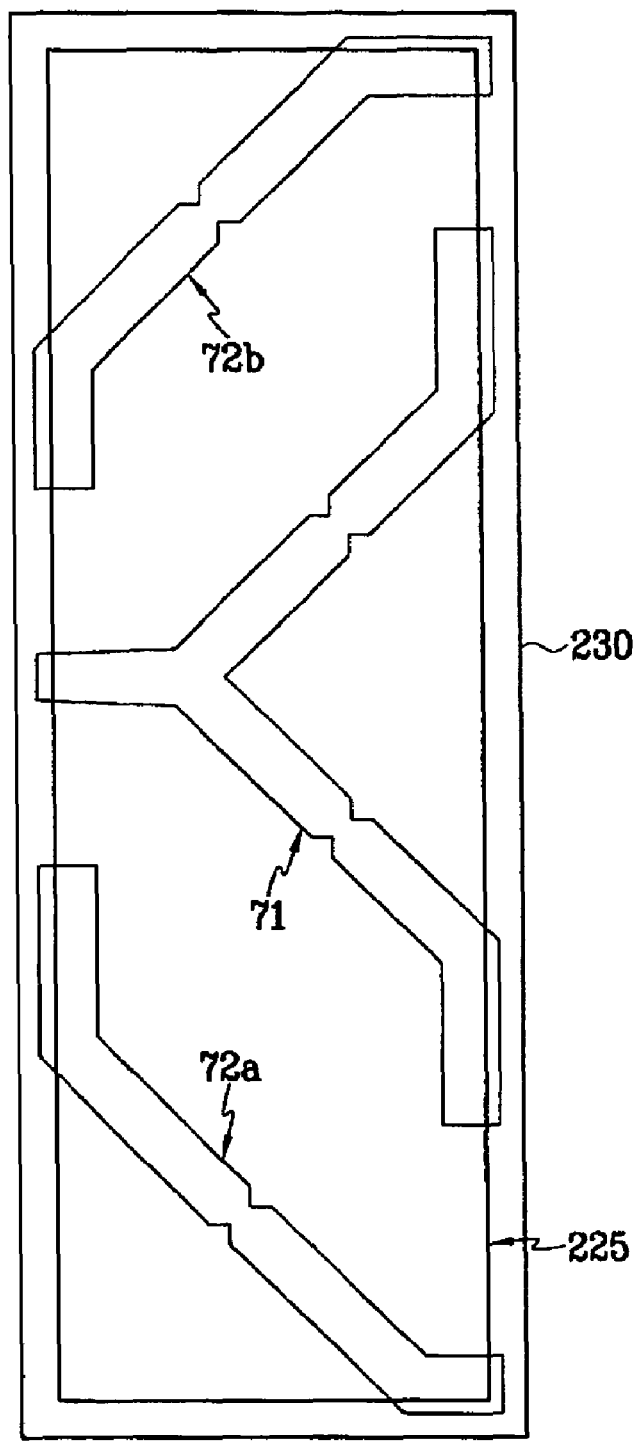
FIG. 2 is a layout view of a common electrode panel of an LCD according to an embodiment of the present invention.

Common electrode panel 200 will now be described with reference to FIG. 2 through FIG. 4.

A light blocking member 220 referred to as a black matrix for preventing light leakage can be formed on an insulating substrate 210 such as transparent glass or plastic. Light blocking member 220 has a plurality of openings 225 that face pixel electrodes 190 and it may have substantially the same planar shape as pixel electrode 190. Otherwise, light blocking member 220 may include a plurality of rectilinear portions facing data lines 171 on TFT array panel 100 and a plurality of widened portions facing TFTs on the TFT array panel 100.

A plurality of color filters 230 may also be formed on the substrate 210 and they are disposed substantially in the areas enclosed by light blocking member 220. Color filters 230 may extend substantially along the longitudinal direction of pixel electrode 190. Color filters 230 may represent one of the primary colors such as red, green or blue.

An overcoat 250 can be formed on color filters 230 and light blocking member 220. Overcoat 250 is preferably made of an organic insulator and it provides a flat surface and further prevents color filters 230 from being exposed.

Common electrode 270 is formed on overcoat 250. Common electrode 270 is preferably made of transparent conductive material such as ITO and IZO and may include sets of cutouts 71, 72a and 72b.

A set of cutouts face pixel electrode 190 and include a center cutout 71, a lower cutout 72a, and an upper cutout 72b. Each of the cutouts 71-72b is disposed between adjacent cutouts 91-92b or between a cutout 92a or 92b and a chamfered edge of pixel electrode 190. Each of the cutouts 71-72b has at least an oblique portion having a depressed notch and extending parallel to either lower cutout 92a or upper cutout 92b. Cutouts 71-72b can be approximately symmetrical with respect to a capacitive electrode 136.

Figure 3:
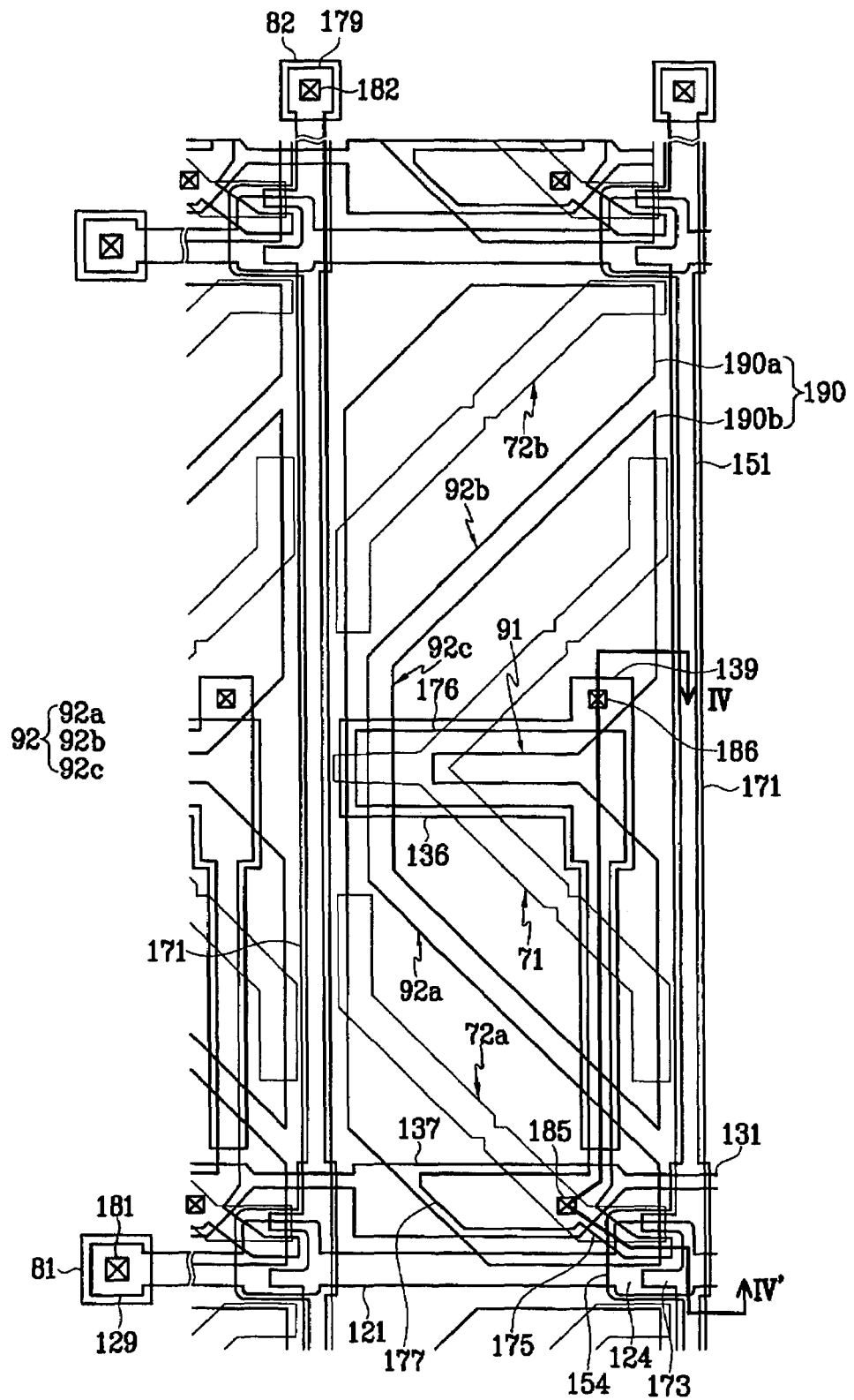
FIG. 3 is a layout view of an LCD including the TFT array panel shown in FIG. 1 and the common electrode panel shown in FIG. 2.

As shown in FIG. 3, each of the lower and upper cutouts 72a and 72b includes an oblique portion extending approximately from a left edge of pixel electrode 190 towards a lower or upper edge, and transverse and longitudinal portions extending from respective ends of the oblique portion along edges of pixel electrode 190, overlapping the edges of the pixel electrode 190, and making obtuse angles with the oblique portions.

Center cutout 71 includes a central transverse portion extending approximately from the left edge of the pixel electrode 190 along a transverse line, a pair of oblique portions extending from an end of the central transverse portion towards approximately a right edge of pixel electrode 190, and a pair of terminal longitudinal portions extending from the ends of the respective oblique portions along the right edge of pixel electrode 190, thereby overlapping the right edge of the pixel electrode 190 and forming obtuse angles with the respective oblique portions.

As with the cutouts 91-92b, the number of the cutouts 71-72b may be varied depending on the design factors. Also, light blocking member 220 may also overlap the cutouts 71-72b to block the light leakage therethrough.

Alignment layers 11 and 21, which may be homeotropic, and polarizers 12 and 22, may be provided on the inner and outer surfaces, respectively, of panels 100 and 200 so that their polarization axes may be crossed and one of the polarization axes may be parallel to the gate lines 121. One of the polarizers 12 or 22 may be omitted when the LCD is a reflective LCD.

The LCD may further include at least one retardation film (not shown) for compensating the retardation of LC layer 3. The retardation film has birefringence and gives a retardation opposite to that given by LC layer 3.

The LCD may further include a backlight unit (not shown) supplying light to the LC layer 3 through polarizers 12 and 22, the retardation film, and panels 100 and 200.

It is preferable that LC layer 3 has negative dielectric anisotropy and it is subjected to a vertical alignment such that LC molecules 310 are aligned with their longitudinal axes are substantially perpendicular to the surfaces of the panels 100 and 200 in absence of electric field. Accordingly, incident light cannot pass the crossed polarization system of polarizers 12 and 22.

Alternatively, a pixel of the LCD may include a TFT Q comprising a first subpixel including a first LC capacitor Clca and a storage capacitor Cst, and a second subpixel including a second LC capacitor Clcb, and a coupling capacitor Ccp.

The first LC capacitor Clca includes outer sub-pixel electrode 190a as one terminal, a corresponding portion of common electrode 270 as the other terminal, and a portion of LC layer 3 disposed therebetween as a dielectric. Similarly, the second LC capacitor Clcb has a similar structure and includes inner sub-pixel electrode 190b as one terminal, a corresponding portion of the common electrode 270 as the other terminal, and a portion of the LC layer 3 disposed thereon as a dielectric.

The storage capacitor Cst includes expansion 177 of a drain electrode 175 as one terminal, storage electrode 137 as the other terminal, and a portion of gate insulating layer 140 disposed therebetween as a dielectric.

The coupling capacitor Ccp includes inner sub-pixel electrode 190b and capacitive electrode 136 as one terminal, coupling electrode 176 as the other terminal, and portions of passivation layer 180 and gate insulating layer 140 disposed therebetween as a dielectric.

The first LC capacitor Clca and the storage capacitor Cst are connected in parallel to a drain of the TFT Q. The coupling capacitor Ccp is connected between the drain of the TFT Q and the second LC capacitor Clcb. Common electrode 270 is supplied with a common voltage Vcom, which can be supplied to storage electrode lines 131.

The TFT Q applies data voltages from data line 171 to the first LC capacitor Clca and the coupling capacitor Ccp in response to a gate signal from gate line 121, and the coupling capacitor Ccp transmits the data voltage with a modified magnitude to the second LC capacitor Clcb.

If storage electrode line 131 is supplied with the common voltage Vcom and each of the capacitors Clca, Cst, Clcb and Ccp and the capacitance thereof are denoted as the same reference characters, the voltage Vb charged across the second LC capacitor Clcb is given as:

$$Vb = Va \times [Ccp/(Ccp+Clcb)],$$

where Va denotes the voltage of the first LC capacitor Clca.

Since the term Ccp/(Ccp+Clcb) is smaller than one, the voltage Vb of the second LC capacitor Clcb is less than that of the first LC capacitor Clca. This inequality may be also true for a case where the voltage of storage electrode line 131 is not equal to the common voltage Vcom.

When the potential difference is generated across the first LC capacitor Clca or the second LC capacitor Clcb, an electric field substantially perpendicular to the surfaces of panels 100 and 200 is generated in LC layer 3 and both pixel electrode 190 and the common electrode 270 are commonly referred to as field generating electrodes hereinafter. Then, LC molecules 310 in LC layer 3 tilt in response to the electric field such that their longitudinal axes are perpendicular to the field direction. The degree of the tilt of LC molecules 310 determines the variation of the polarization of light incident on LC layer 3, which is transformed into the variation of the light transmittance by the polarizers 12 and 22. In this way, the LCD displays images.

The tilt angle of LC molecules 310 depends on the strength of the electric field. Since the voltage Vb of the first LC capacitor Clca and the voltage Va of the second LC capacitor Clcb are different from each other, the tilt direction of LC molecules 310 in the first subpixel is different from that in the second subpixel and thus the luminances of the two subpixels are different. Accordingly, with maintaining the average luminance of the two subpixels in a target luminance, the voltages Va and Vb of the first and second subpixels can be adjusted so that an image viewed from a lateral side is the closest to an image viewed from the front, thereby improving the lateral visibility.

The ratio of the voltages Va and Vb can be adjusted by varying the capacitance of the coupling capacitor Ccp, and the coupling capacitance Ccp can be varied by changing the overlapping area and distance between coupling electrode 176 and inner sub-pixel electrode 190b (and the capacitive electrode 136). For example, the distance between coupling electrode 176 and inner sub-pixel electrode 190b becomes large when capacitive electrode 136 is removed and coupling electrode 176 is moved to the former position of capacitive electrode 136. Preferably, the voltage Vb of the second LC capacitor Clcb is from about 0.6 to about 0.8 times the voltage Va of the first LC capacitor Clca.

The voltage Vb charged in the second LC capacitor Clcb may be larger than the voltage Va of the first LC capacitor Clca. This can be realized by precharging the second LC capacitor Clcb with a predetermined voltage such as the common voltage Vcom.

Inner sub-pixel electrode 190b of the second subpixel is preferably about 0.8-1.5 times wider than outer subpixel electrode 190a of the first subpixel and the number of the sub-pixel electrodes in each of the LC capacitors Clca and Clcb may be changed.

The tilt direction of the LC molecules 310 is influenced by a horizontal component generated by the cutouts 91-92b and 71-72b of field generating electrodes 190 and 270 and the oblique edges of pixel electrodes 190 distorting the electric field, which is substantially perpendicular to the edges of cutouts 91-92b and 71-72b and the oblique edges of pixel electrodes 190. Referring to FIG. 3, a set of the cutouts 91-92b and 71-72b divides a pixel electrode 190 into a plurality of sub-areas and each sub-area has two major edges. Since LC molecules 310 on each sub-area tilt perpendicular to the major edges, the azimuthal distribution of the tilt directions are localized to four directions, thereby increasing the reference viewing angle of the LCD.

The notches in cutouts 71-72b determine the tilt directions of the LC molecules 310 on the cutouts 71-72b and they may be provided at the cutouts 91-92b as well and may have various shapes and arrangements.

The shapes and the arrangements of cutouts 91-92b and 71-72b for determining the tilt directions of LC molecules 310 may be modified and at least one of cutouts 91-92b and 71-72b can be substituted with protrusions (not shown) or depressions (not shown). The protrusions can be made of organic or inorganic material and disposed either on or under field-generating electrodes 190 or 270.

Figure 6:
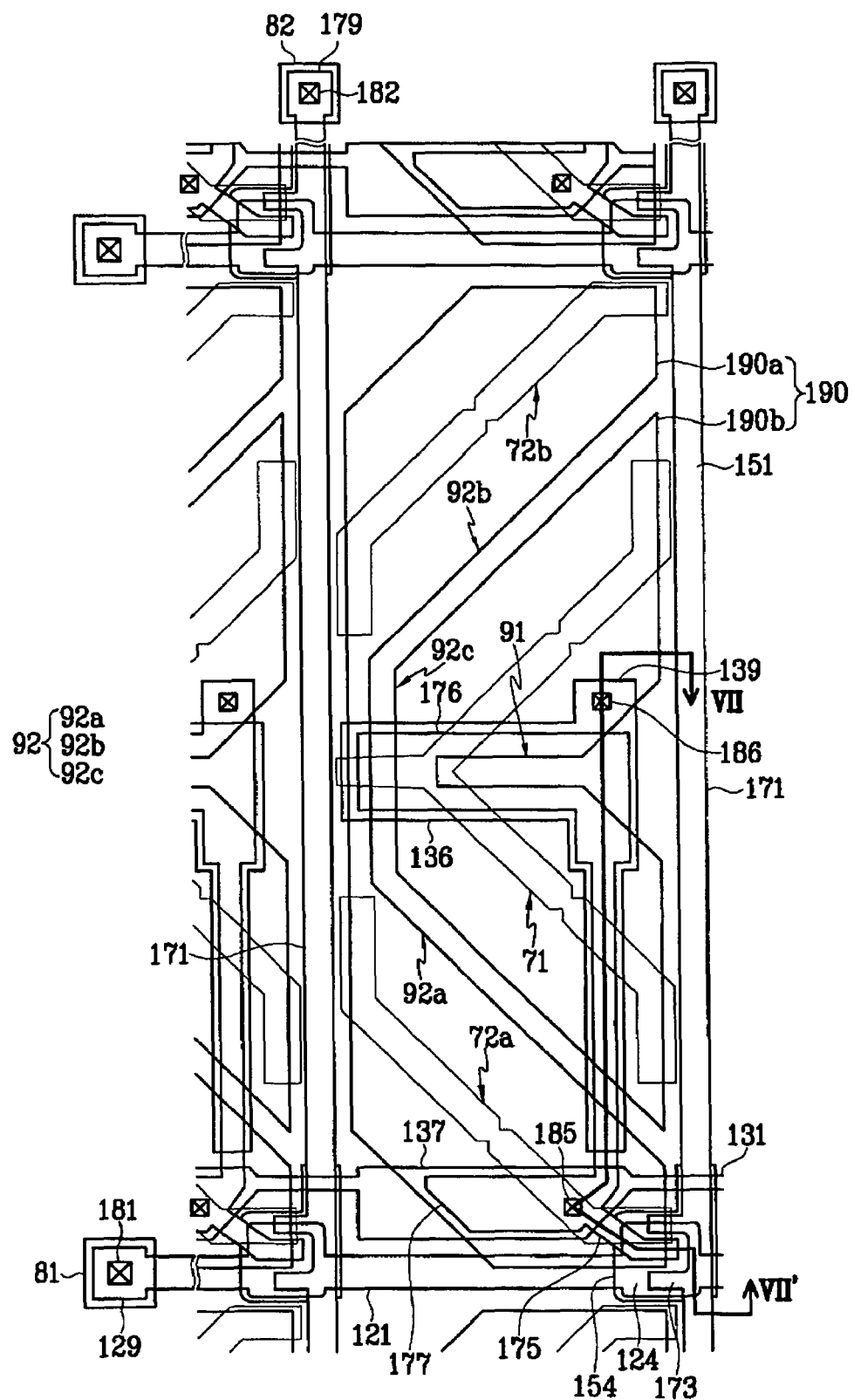
FIG. 6 is a layout view of an LCD according to another embodiment of the present invention.

An LCD according to another embodiment of the present invention will be described in detail with reference to FIGS. 6 and 7.

Layered structures of the panels 100 and 200 according to this embodiment are almost the same as those shown in FIG. 1 through FIG. 4.

In this embodiment, however, semiconductor stripes 151 have almost the same planar shapes as data lines 171 and drain electrodes 175 as well as the underlying ohmic contacts 161 and 165. But semiconductor stripes 151 include some exposed portions, which are not covered with data lines 171 and drain electrodes 175, such as portions of semiconductor stripes 151 located between the source electrodes 173 and the drain electrodes 175.

In addition, capacitive electrodes 136 have no oblique portion, and each of the drain electrodes 175 includes an interconnection 178 extending parallel to the data lines 171 and connecting the expansion 177 and the coupling electrode 176 near left sides thereof.

Figure 4:
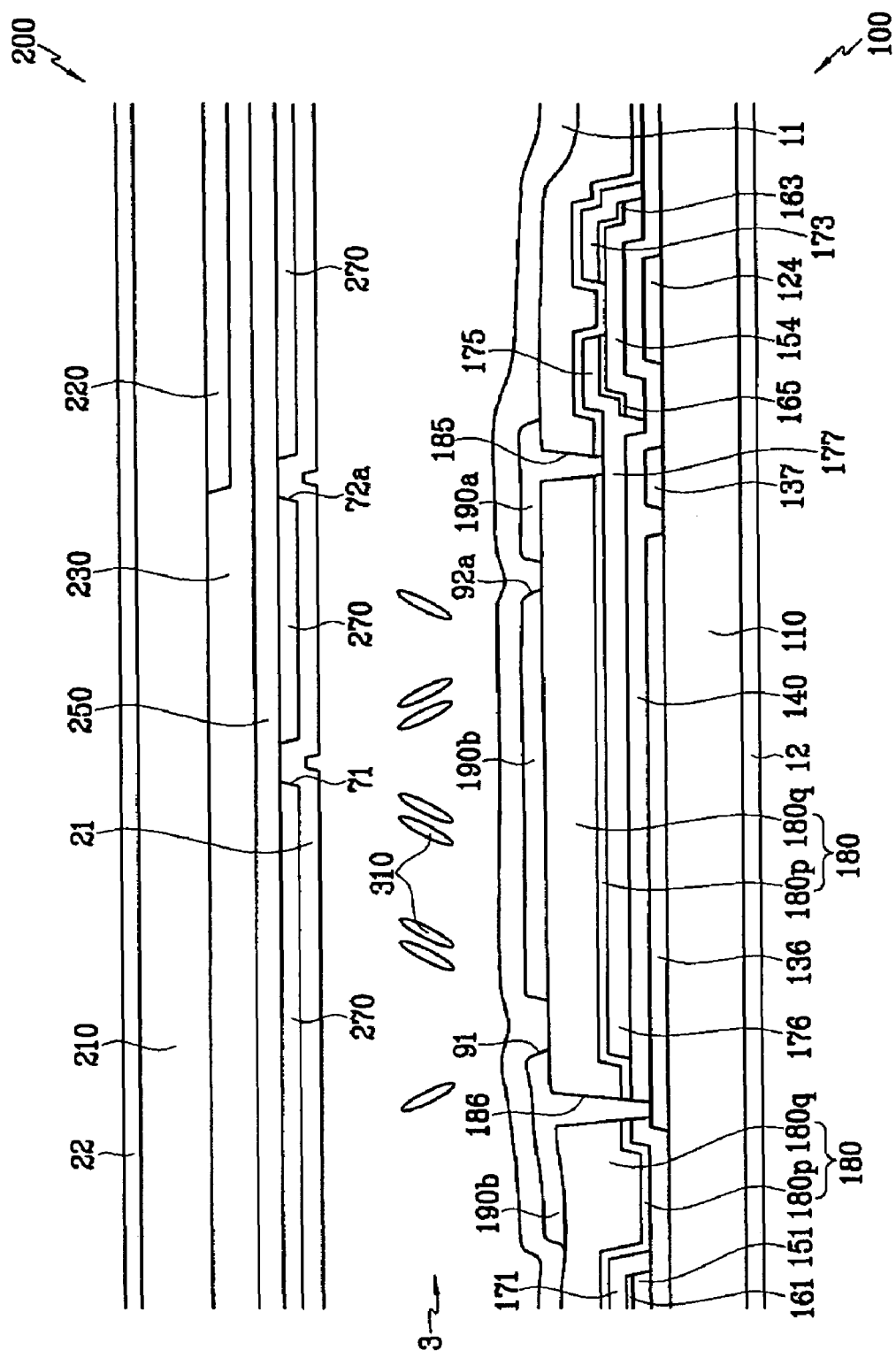
FIG. 4 is a sectional view of the LCD shown in FIG. 3 taken along line IV-IV'.
Figure 5:
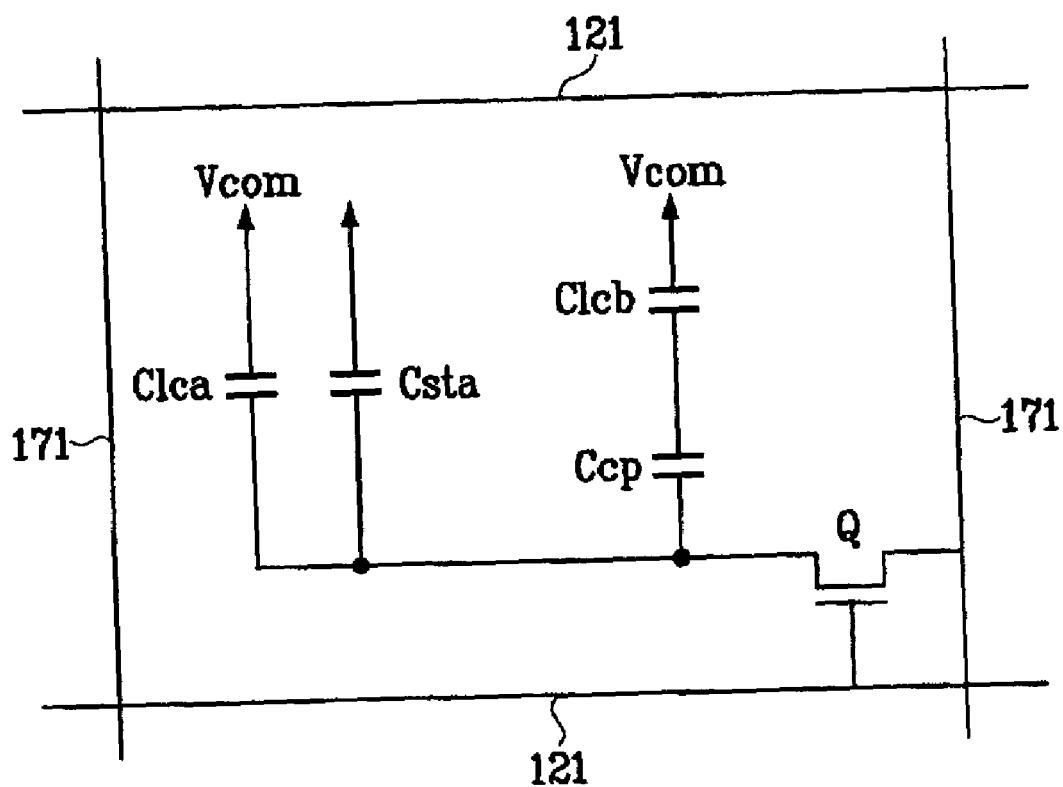
FIG. 5 is an equivalent circuit diagram of the LCD shown in FIG. 1 to FIG. 4.
Figure 7:
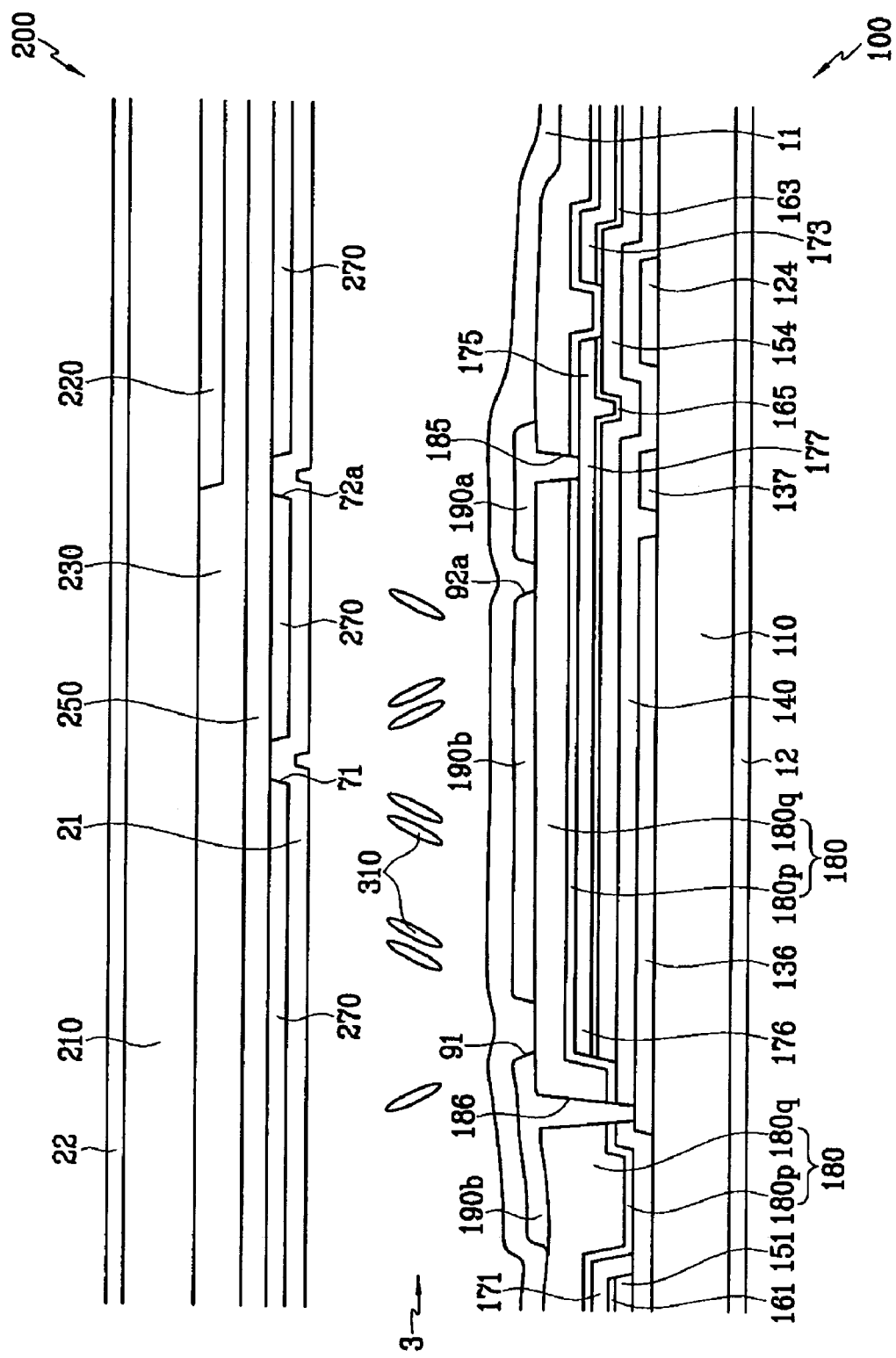
FIG. 7 is a sectional view of the LCD shown in FIG. 6 taken along line VII-VII'.

A manufacturing method of the TFT array panel shown in FIG. 4 and FIG. 7, for example, simultaneously forms data lines 171, the drain electrodes 175, semiconductors 151, and ohmic contacts 161 and 165 using one photolithography step.

A photoresist masking pattern for the photolithography process has varying thicknesses, and in particular, it has thicker portions and thinner portions. The thicker portions are located on wire areas that will be occupied by data lines 171 and drain electrodes 175, and the thinner portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, or one or more thin films with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask having only transparent areas and opaque areas, it is subject to a reflow process wherein material may flow onto areas without the photoresist, thereby forming thin portions.

As a result, the manufacturing process is simplified by omitting a photolithography step.

An LCD according to another embodiment of the present invention will be described in detail with reference to FIG. 8, which has a layered structure that is almost the same as that of the LCD shown in FIG. 1 through FIG. 4.

Figure 8:
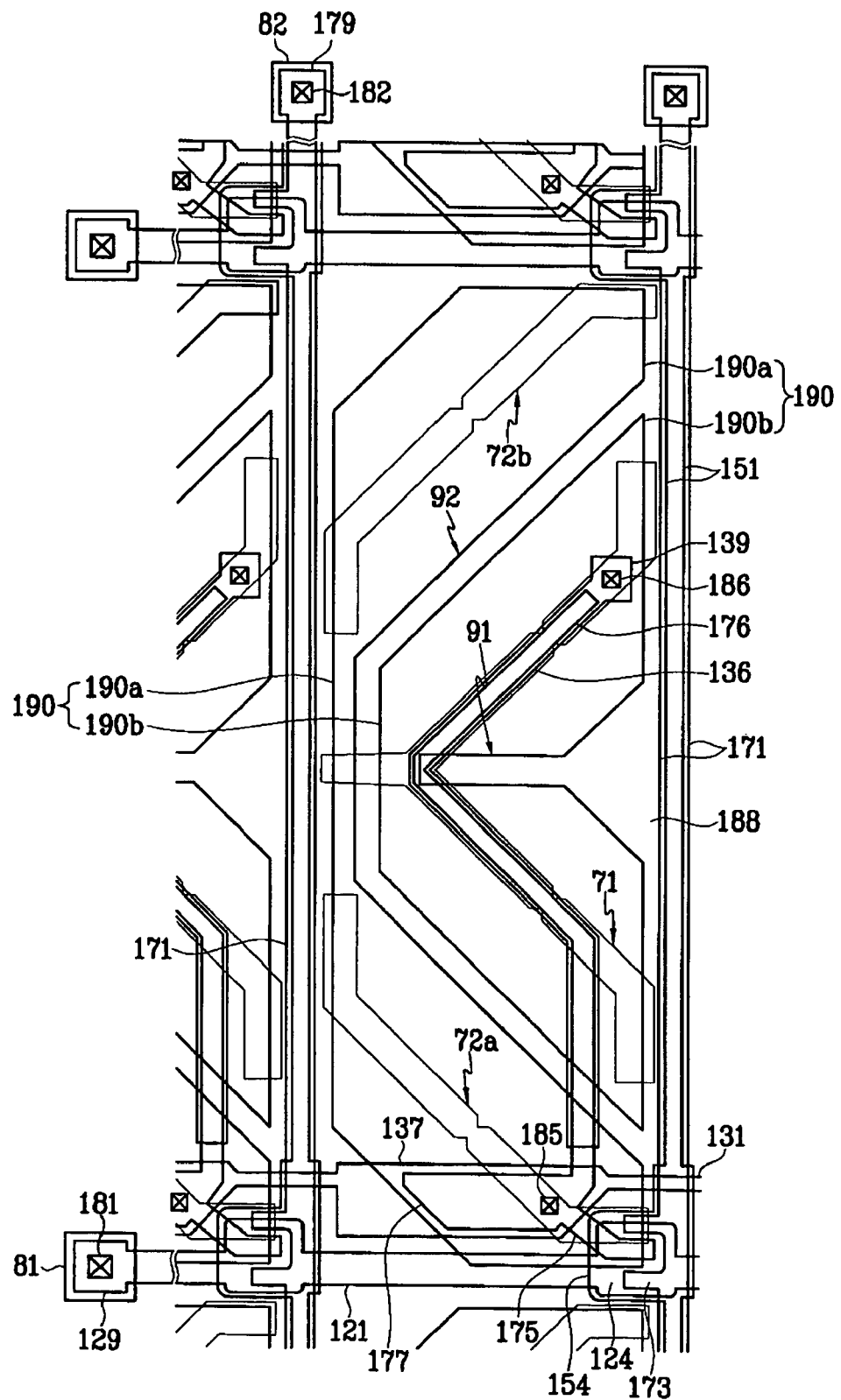
FIG. 8 is a layout view of an LCD according to another embodiment of the present invention.

In the LCD of FIG. 8, however, each of the coupling electrodes 176 extends upward from expansion 177 of drain electrode 175 and turns to extend along a center cutout 71 of common electrode 270. Capacitive electrode 136 has substantially the same shape as coupling electrode 176 except for a projection 139 for contact with a subpixel electrode 190b.

Coupling electrodes 176 and capacitive electrodes 136 block light leakage near the cutouts 71 and useless portions of a transmissive area occupied the electrodes 176 and 136 are reduced, thereby increasing the aperture ratio.

Figure 9:
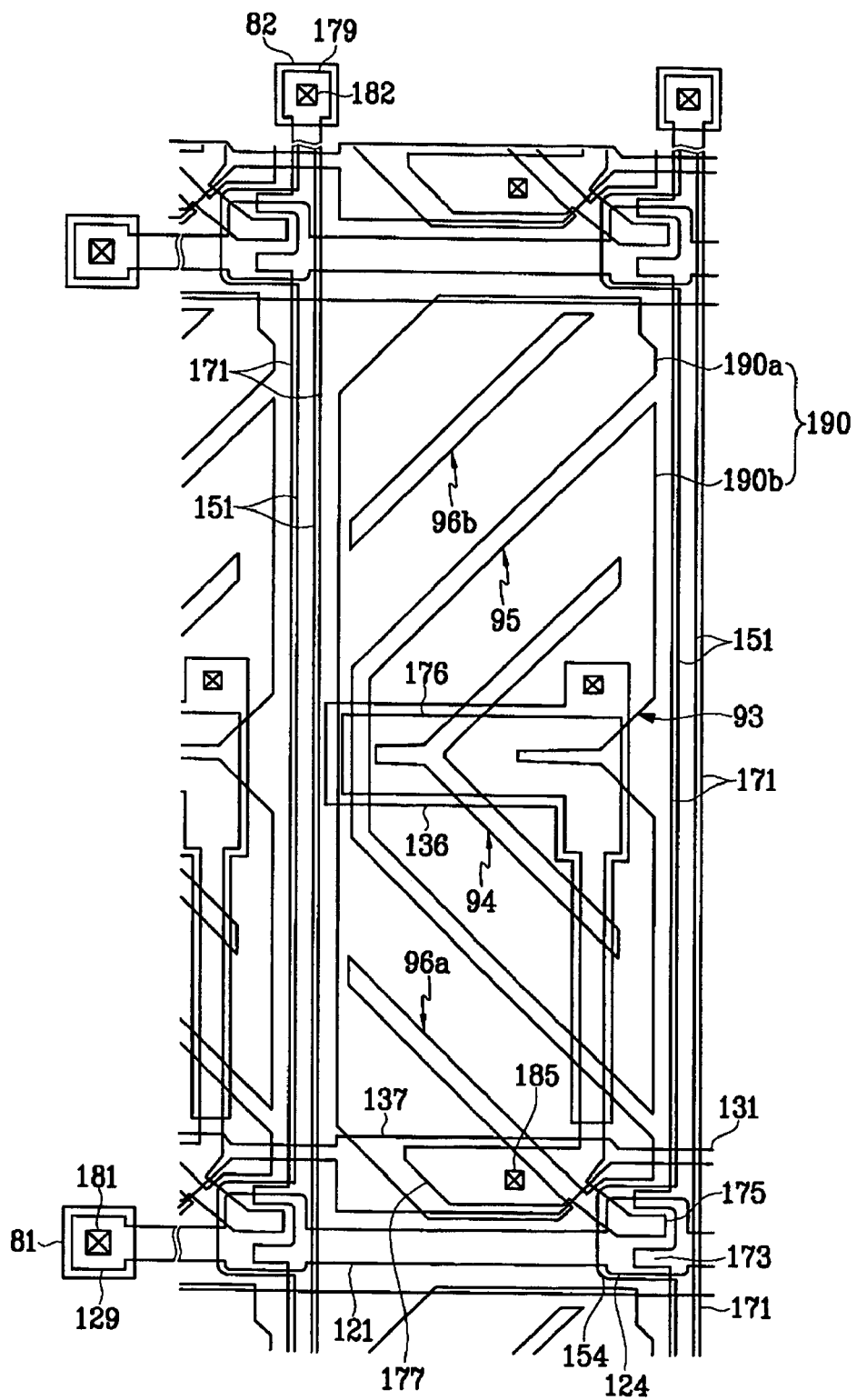
FIG. 9 is a layout view of a TFT array panel of an LCD according to another embodiment of the present invention.
Figure 10:
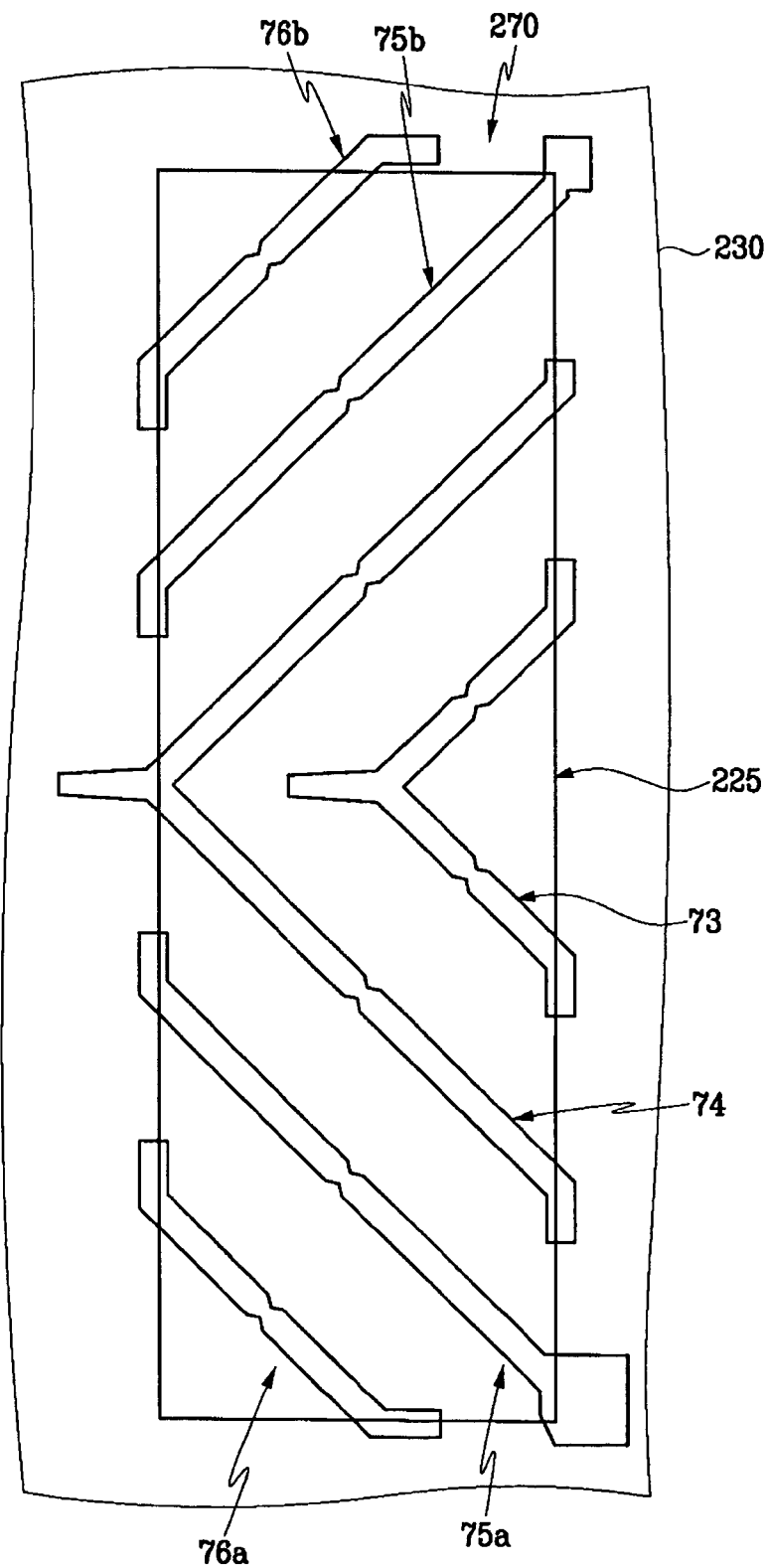
FIG. 10 is a layout view of a common electrode panel of an LCD according to another embodiment of the present invention.
Figure 11:
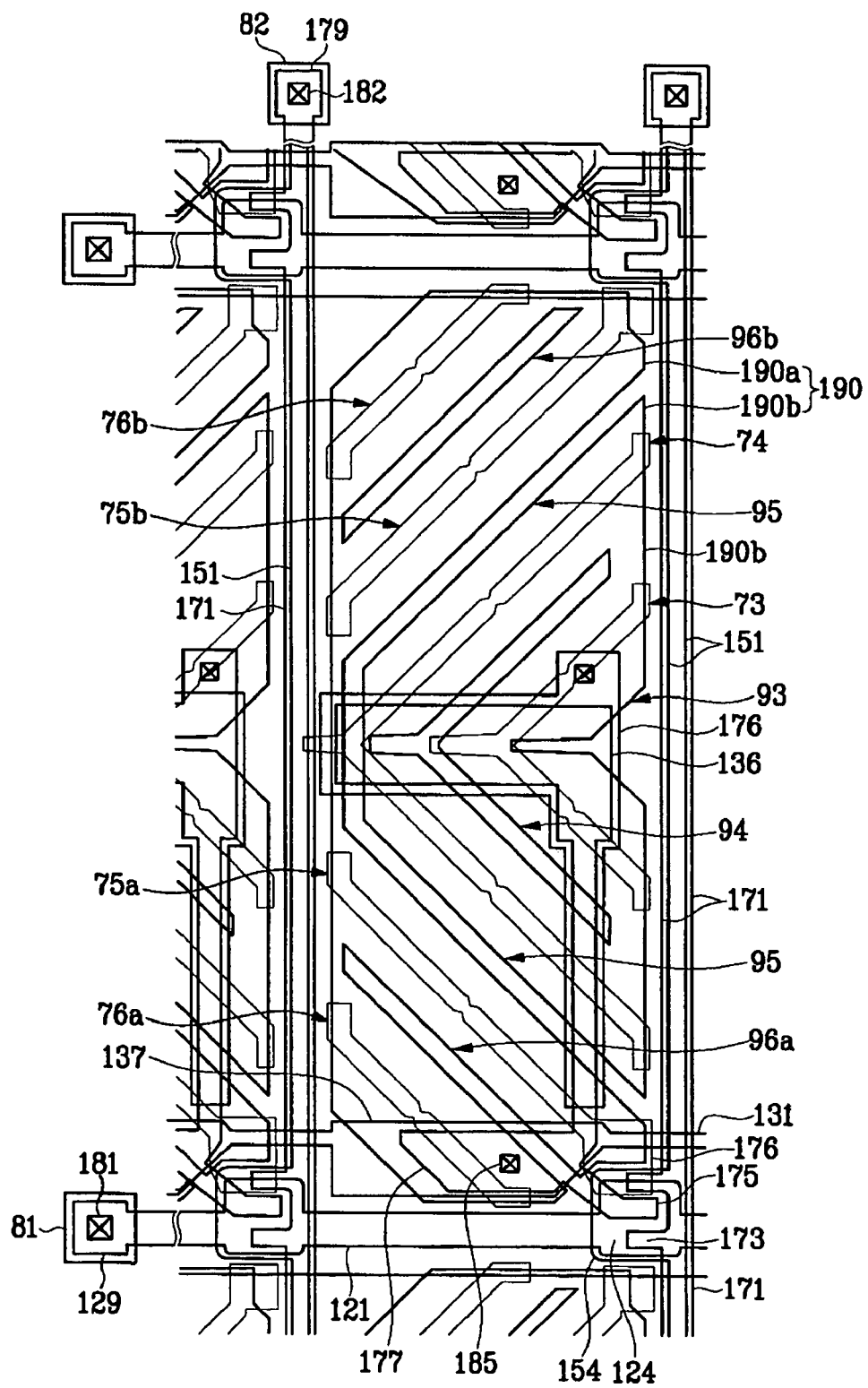
FIG. 11 is a layout view of an LCD including the TFT array panel shown in FIG. 9 and the common electrode panel shown in FIG. 10.
Figure 12:
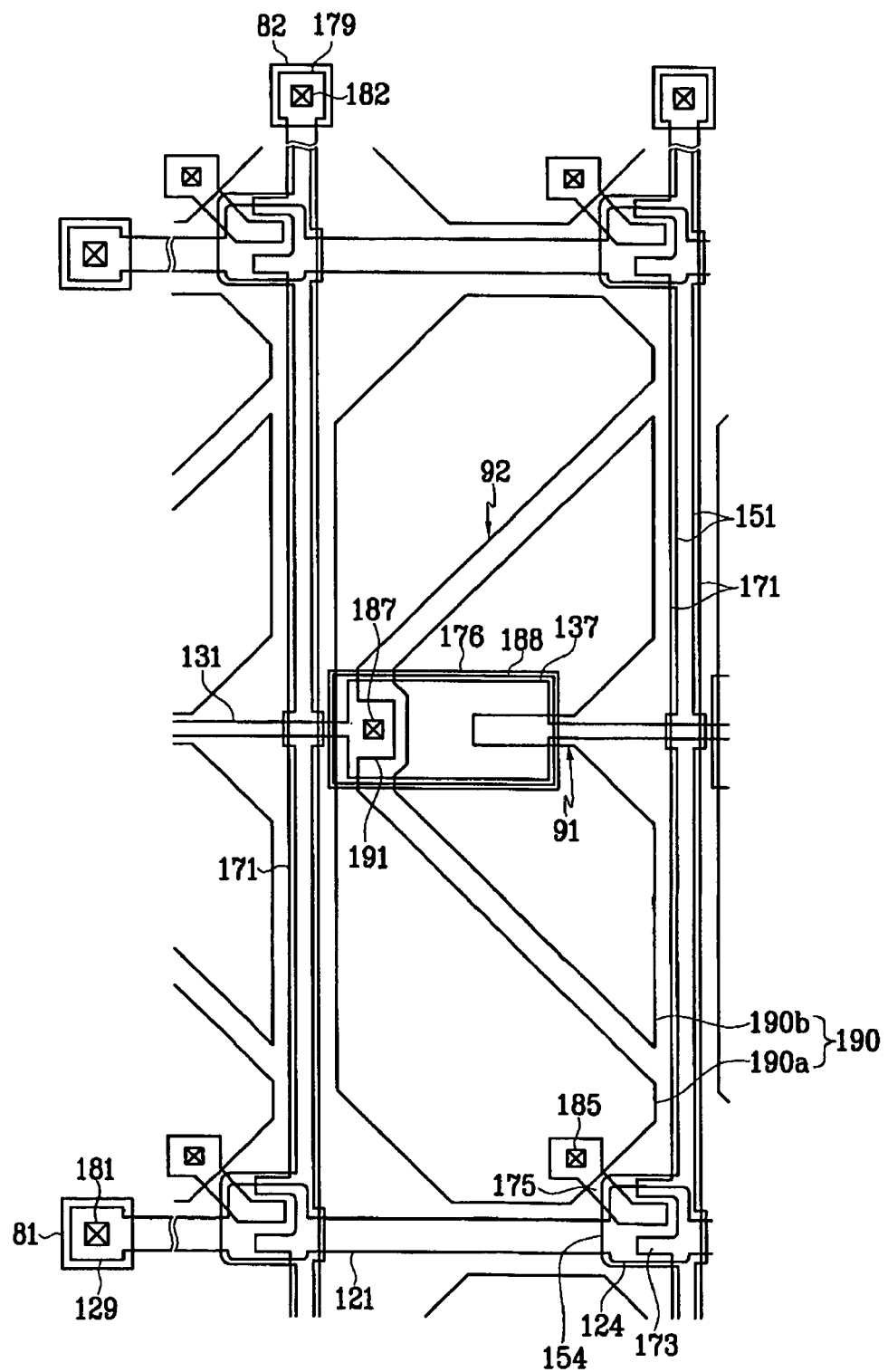
FIG. 12 is a layout view of a TFT array panel of an LCD according to another embodiment of the present invention.
Figure 13:
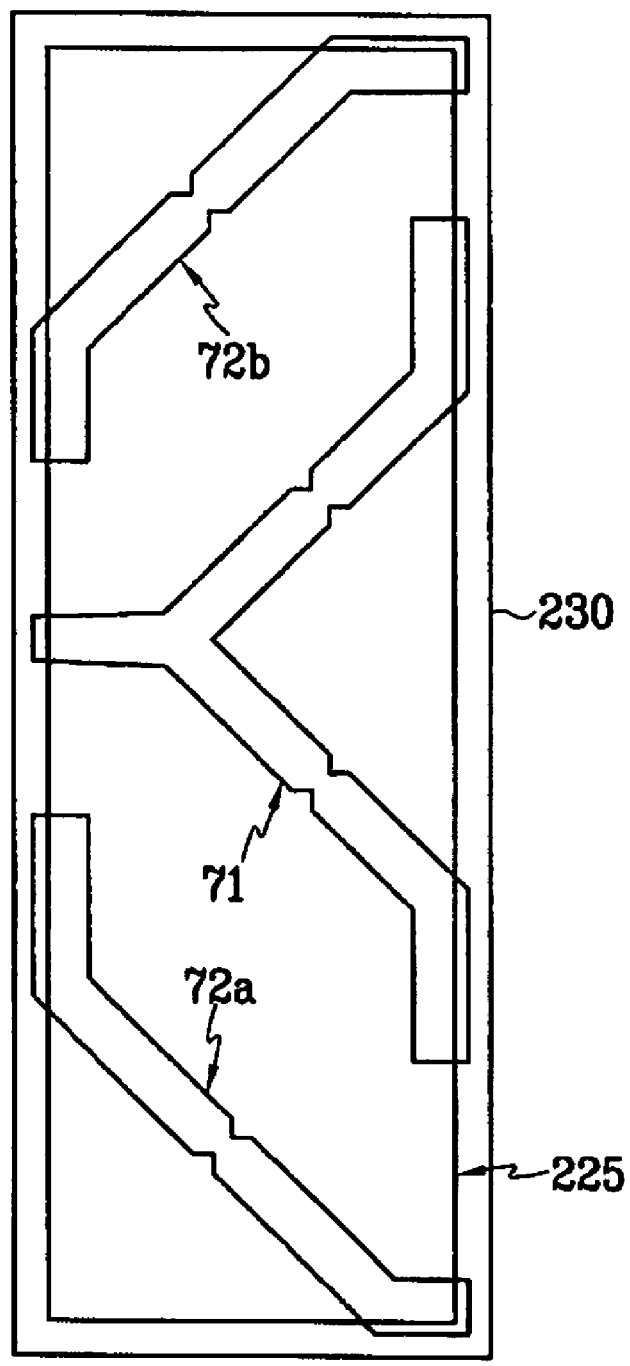
FIG. 13 is a layout view of a common electrode panel of an LCD according to another embodiment of the present invention.
Figure 14:
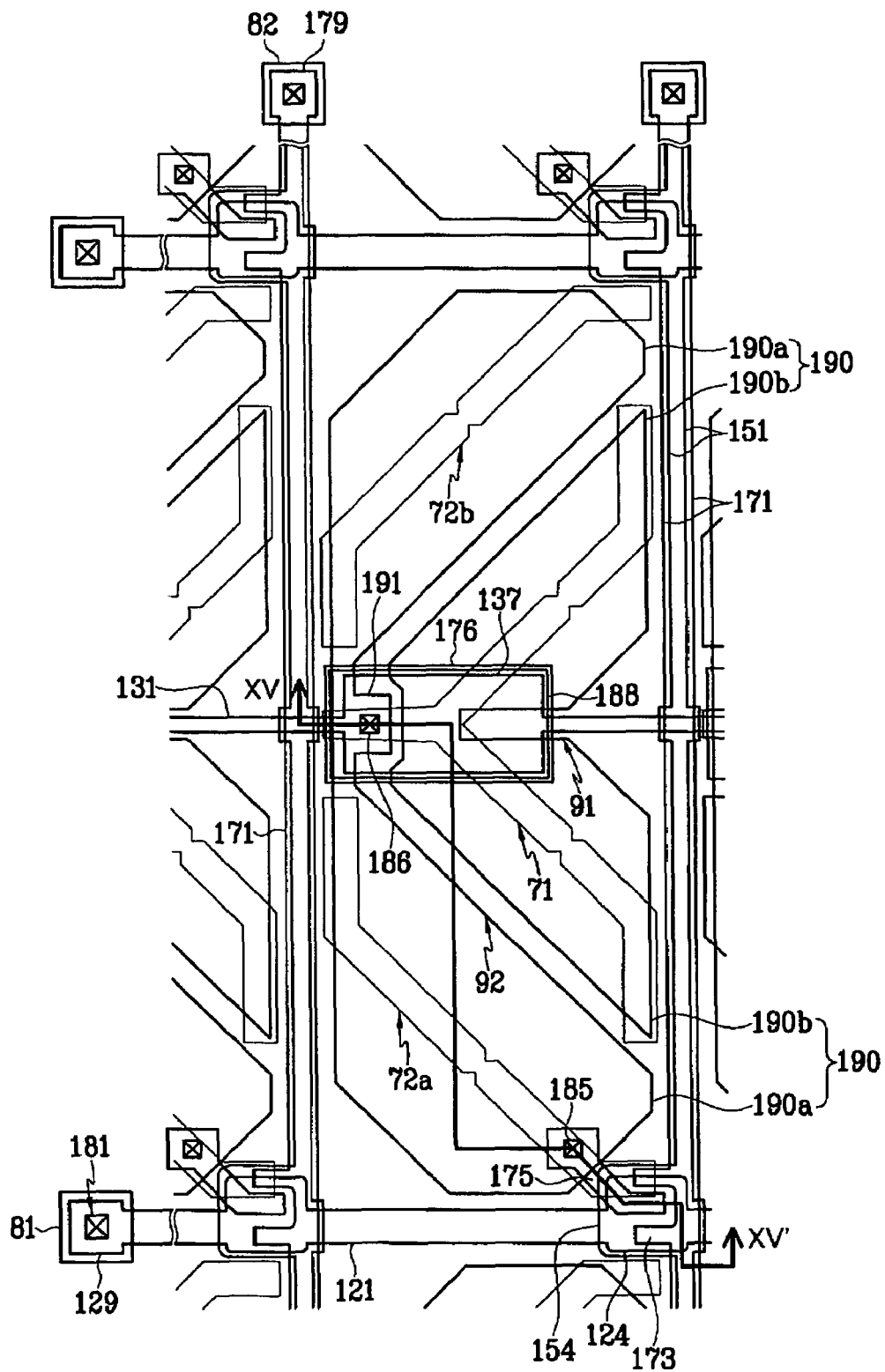
FIG. 14 is a layout view of an LCD including the TFT array panel shown in FIG. 12 and the common electrode panel shown in FIG. 13.

An LCD according to yet another embodiment of the present invention will be described in detail with reference to FIG. 9, FIG. 10 and FIG. 11.

In this embodiment, each pixel electrode has five cutouts 93, 94, 95, 96a and 96b. Cutout 95 is a gap that divides pixel electrode 190 into subpixel electrodes 190a and 190b and cutout 93 in subpixel electrode 190b extends along a transverse portion of a capacitive electrode 136 and has an inlet from the right edge of pixel electrode 190. Cutout 94 in the subpixel electrode 190b includes a short transverse portion extending along the transverse portion of capacitive electrode 136 and a pair of oblique portions obliquely extending toward the right edge of pixel electrode 190. Each of the cutouts 96a and 96b in the subpixel electrode 190a obliquely extends approximately from a lower or upper edge of pixel electrode 190 towards approximately a center left edge of pixel electrode 190.

Similarly, common electrode 270 includes a set of six cutouts 73, 74, 75a, 75b, 76a, and 76b. Each of the cutouts 73 and 74 includes a central transverse portion, a pair of oblique portions, and a pair of terminal longitudinal portions. Each of the cutouts 75a-76b includes an oblique portion and a pair of transverse and longitudinal portions or a pair of a longitudinal portion. In addition, cutouts 75a and 75b include an expansion. The oblique portions of cutouts 73-76b extend parallel to the oblique portions of cutouts 93-96b.

An LCD according to yet another embodiment of the present invention will be described in detail with reference to FIG. 12, FIG. 13, FIG. 14 and FIG. 15.

Layered structures of the panels 100 and 200 according to this embodiment are almost the same as those shown in the previously described embodiments.

In the LCD of this embodiment, however, there is no capacitive electrode.

Each of the storage electrode lines 131 is equidistant from two adjacent gate lines 121 and storage electrodes 137 extend over both the outer and the inner subpixel electrodes 190a and 190b. Coupling electrodes 176 can fully overlap storage electrodes 137 and be physically disconnected from drain electrodes 175, which have no expansion overlapping storage electrode lines 131.

Upper passivation film 180q has a plurality of openings 188 disposed on coupling electrodes 176, and lower film 180p has a plurality of contact holes 187 disposed in the openings 188 that expose coupling electrodes 176.

Each of the outer subpixel electrodes 190a includes lower and upper portions connected by a longitudinal portion, which has a projection 191 connected to coupling electrode 176 through contact hole 187.

Inner subpixel electrodes 190b may overlap coupling electrodes 176 with only the lower passivation layer film 180p in the openings 188 to increase the coupling capacitance without the capacitive electrode.

Figure 15:
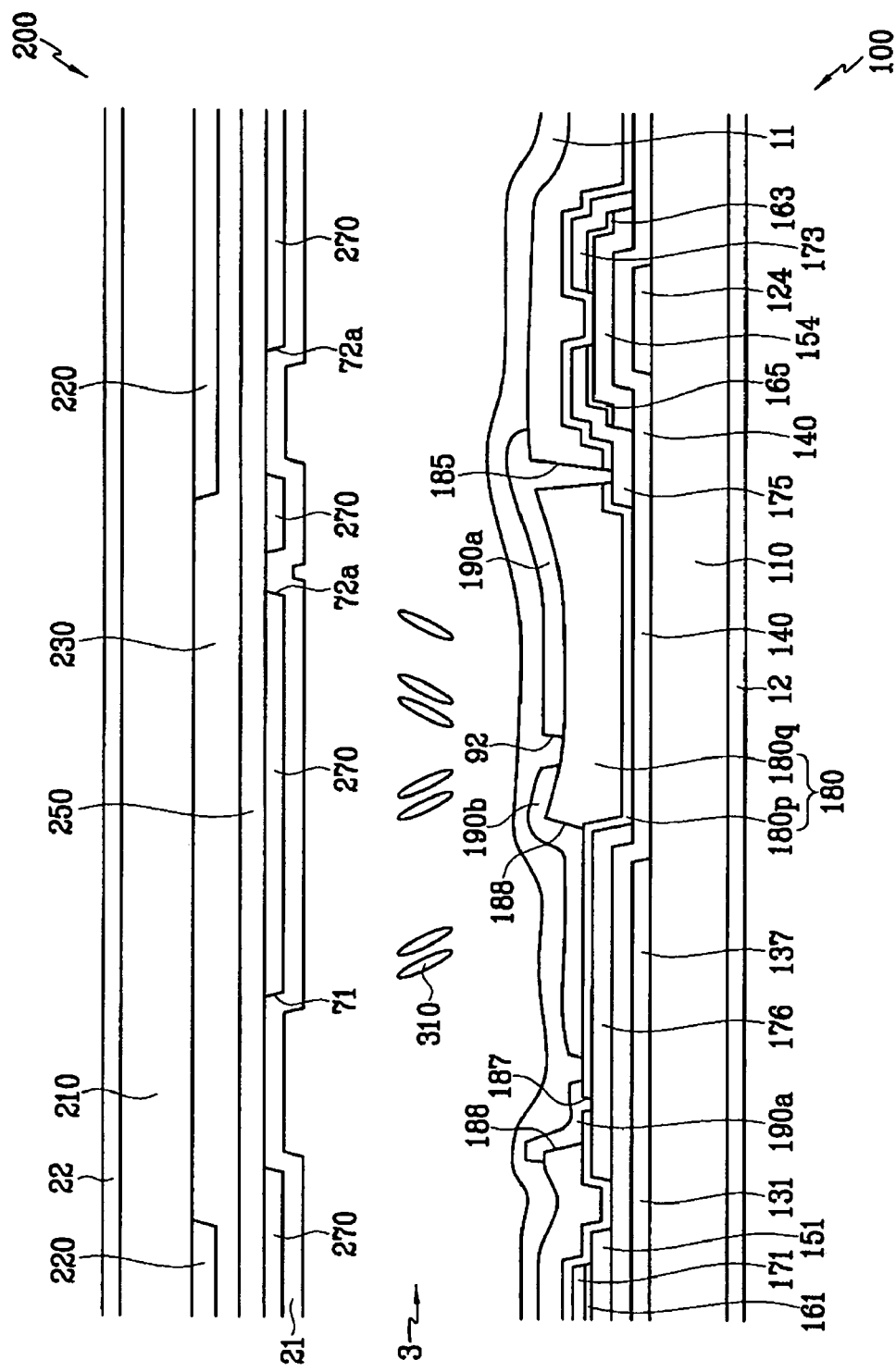
FIG. 15 is a sectional view of the LCD shown in FIG. 14 taken along line XV-XV'.

Now, a method of manufacturing the TFT array panel as shown in FIG. 15, for example, will be described in detail with reference to FIG. 16A through FIG. 21.

Figure 16A:
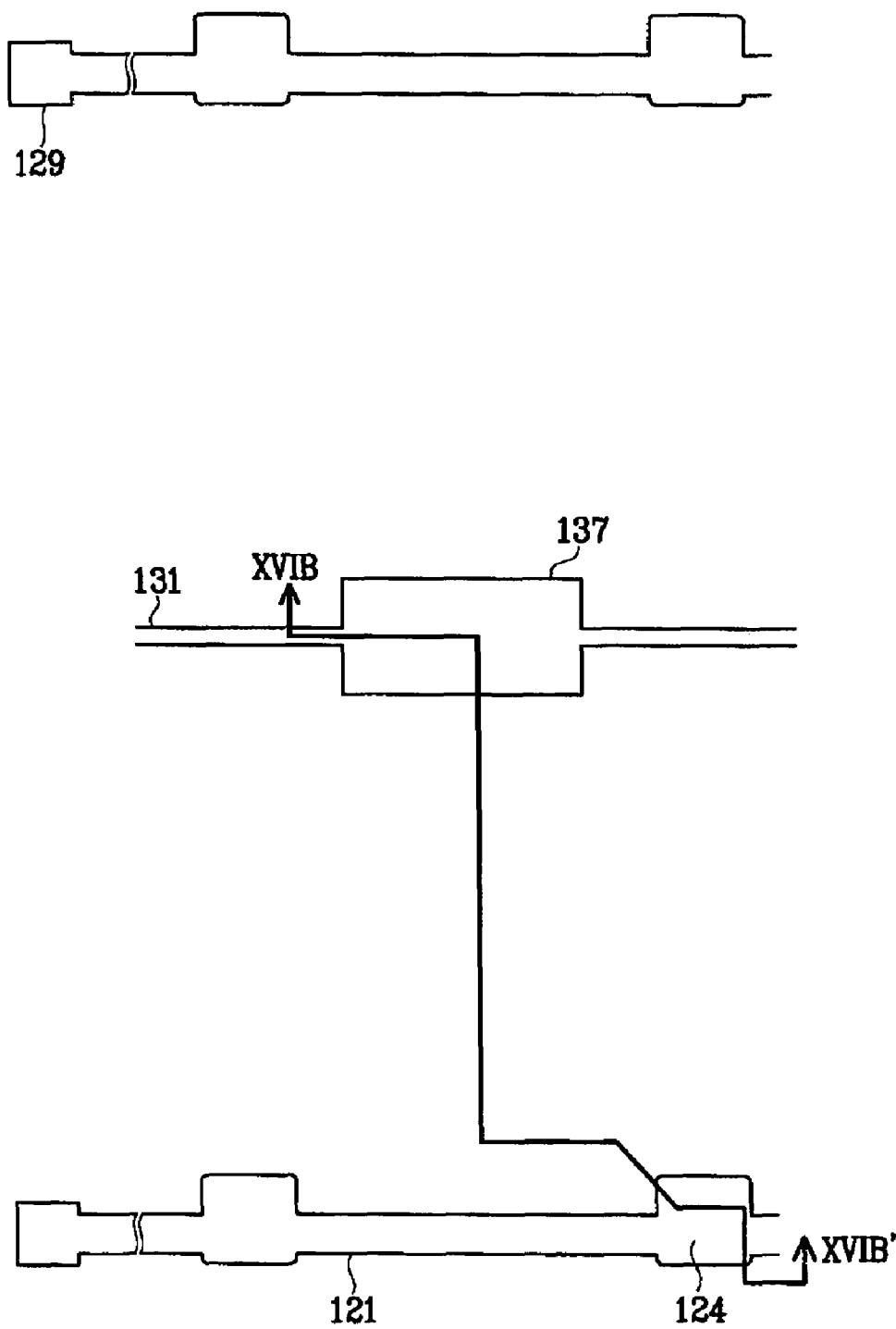
FIG. 16A, FIG. 17A, FIG. 18A and FIG. 20A are layout views of the TFT array panel shown FIG. 12 to FIG. 15 in intermediate steps of a manufacturing method thereof according to an embodiment of the present invention.
Figure 16B:
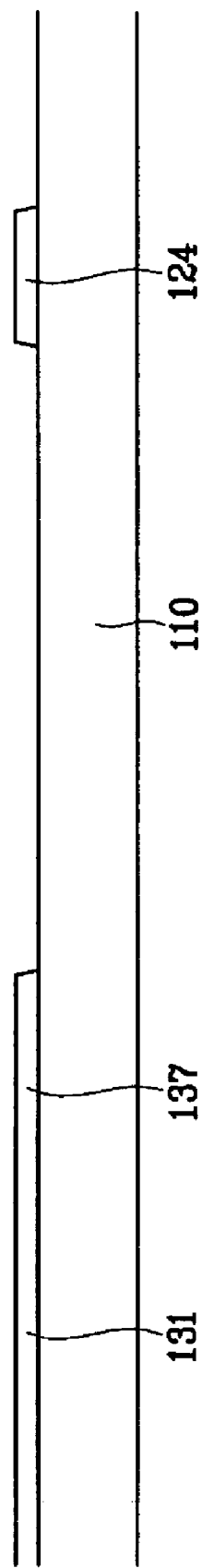
FIG. 16B, FIG. 17B, FIG. 18B and FIG. 20B are sectional views of the TFT array panel shown in FIG. 16A, FIG. 17A, FIG. 18A and FIG. 20A, respectively, taken along lines XVIB-XVIB', XVIIB-XVIIB', XVIIIB-XVIIIB', and XXB-XXB'.

Referring to FIG. 16A and FIG. 16B, a conductive layer preferably made of metal is deposited on an insulating substrate 110 by sputtering, for example. The conductive layer is then subjected to lithography and etching to form a plurality of gate lines 121 that include gate electrodes 124 and end portions 129 and a plurality of storage electrode lines 131 that include storage electrodes 137.

Figure 17A:
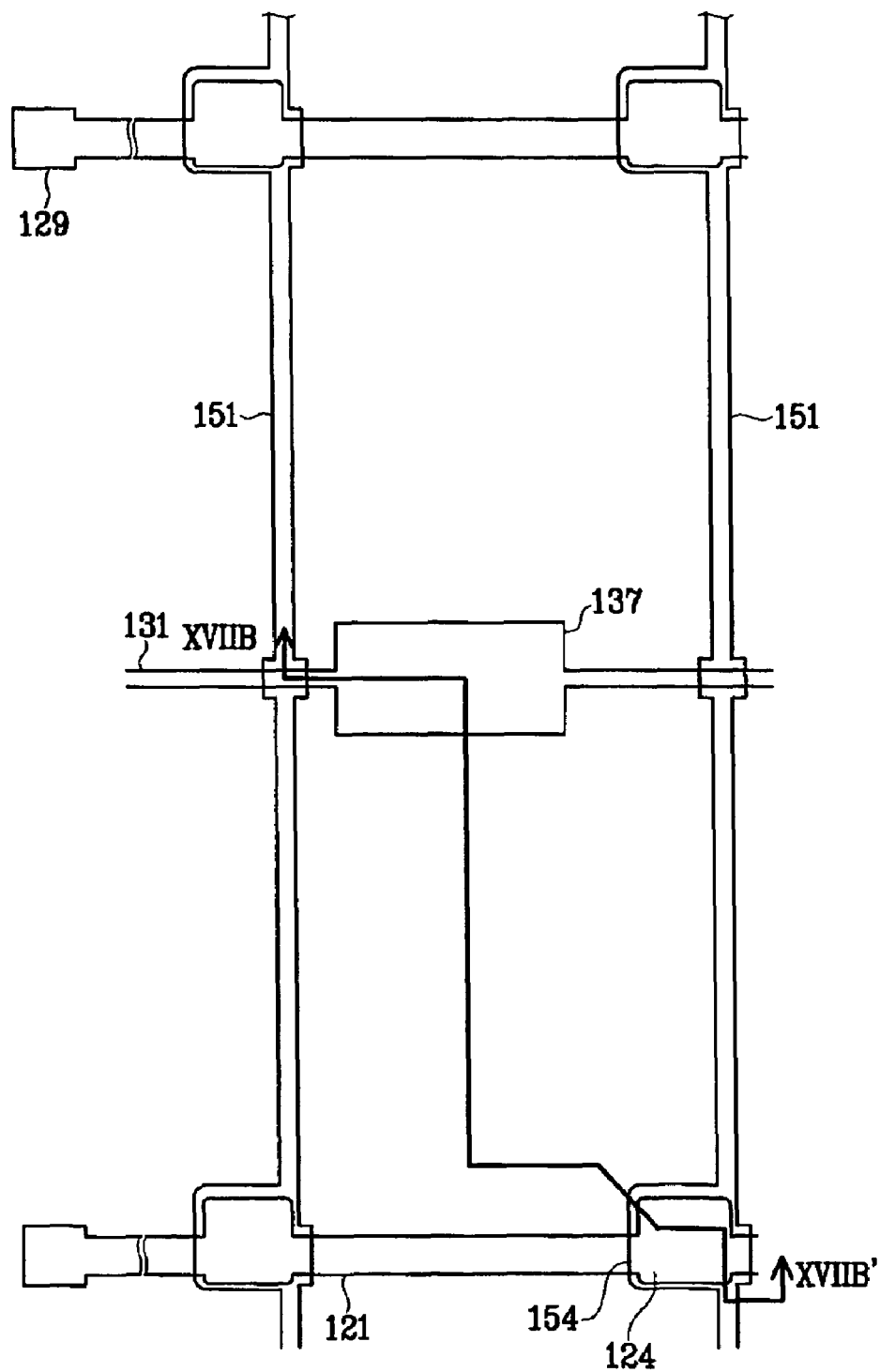
Figure 17B:
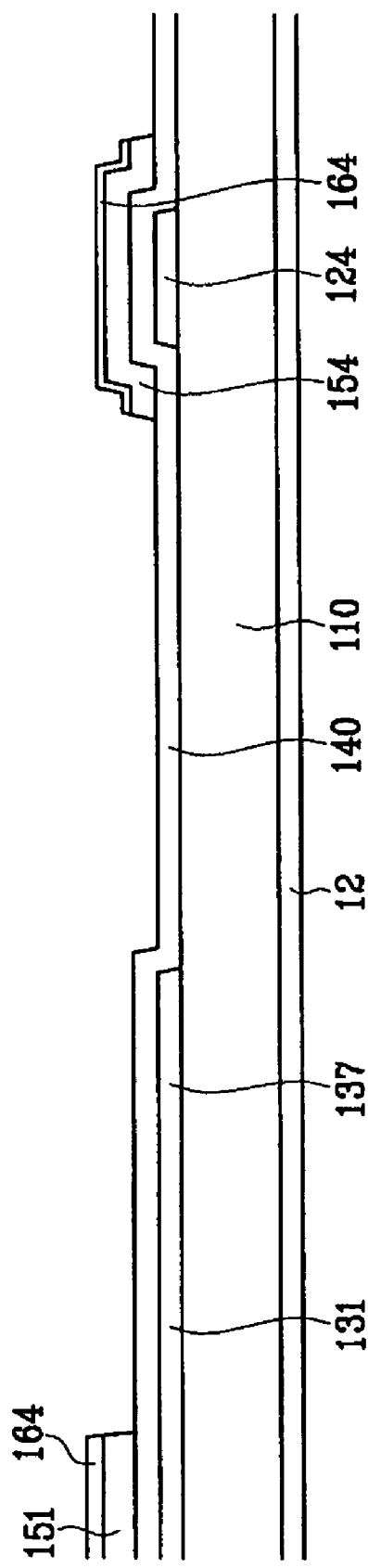

Now looking at FIG. 17A and FIG. 17B, gate insulating layer 140, an intrinsic amorphous silicon layer, and an extrinsic amorphous silicon layer are deposited sequentially. The extrinsic and intrinsic amorphous silicon layers are patterned by lithography and etching to form a plurality of extrinsic semiconductor stripes 164 and a plurality of intrinsic semiconductor stripes 151 that include projections 154.

Figure 18A:
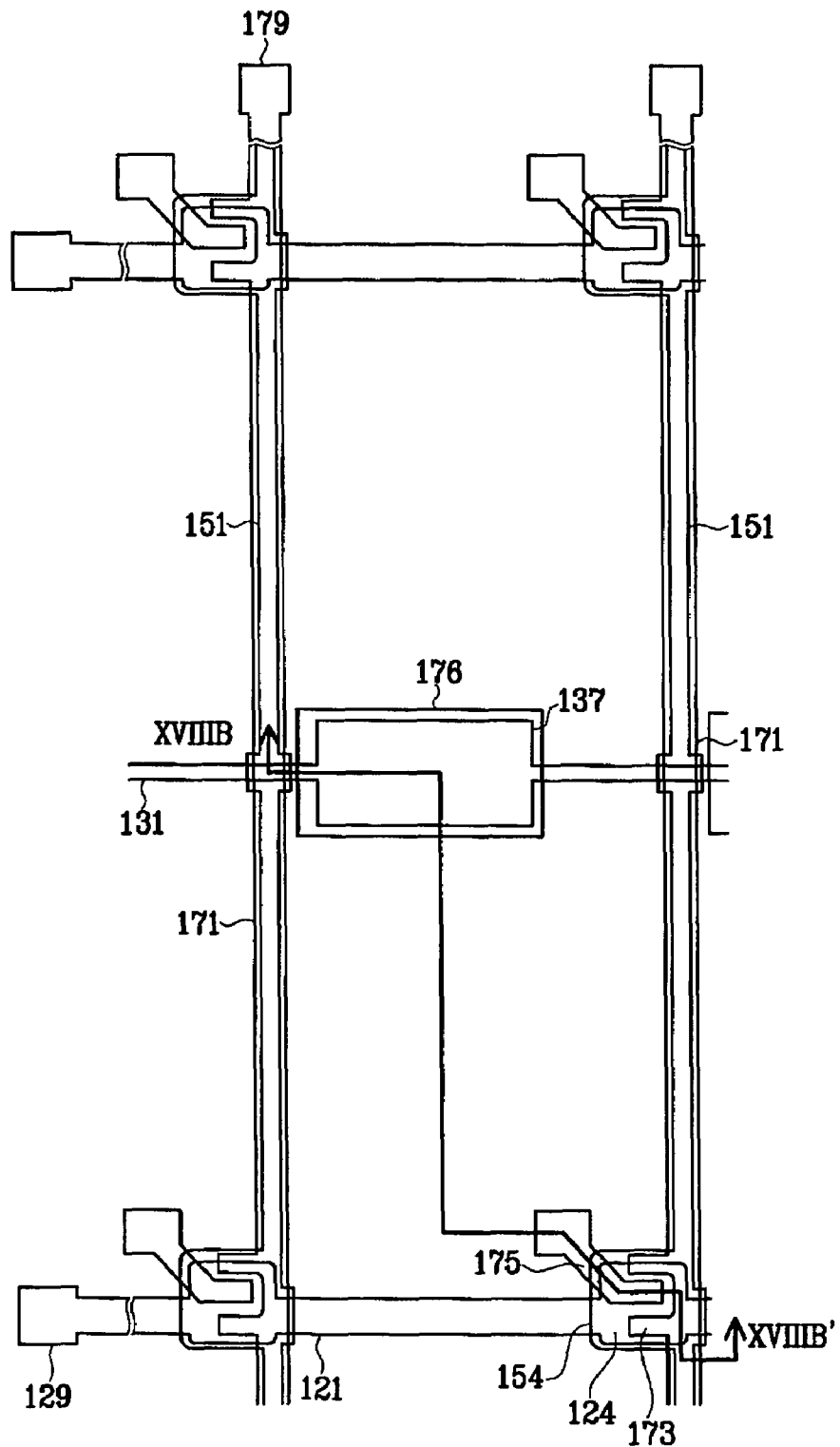
Figure 18B:
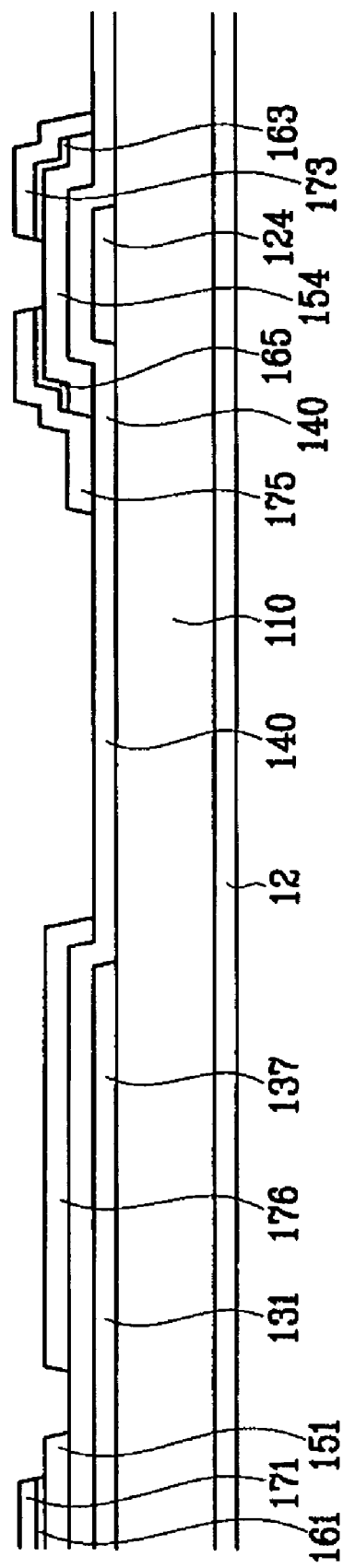

As shown in FIG. 18A and FIG. 18B, a conductive layer is deposited by sputtering, for example, and patterned by lithography and etching to form a plurality of data lines 171 that include source electrodes 173 and end portions 179, a plurality of drain electrodes 175, and a plurality of coupling electrodes 176.

Thereafter, exposed portions of the extrinsic semiconductor stripes, which are not covered with data lines 171 or drain electrodes 175, are removed to complete a plurality of ohmic contact islands 161 and 165 and to expose portions of intrinsic semiconductor stripes 151. An oxygen plasma treatment preferably follows for stabilizing the exposed surfaces of semiconductor stripes 151.

Figure 19:
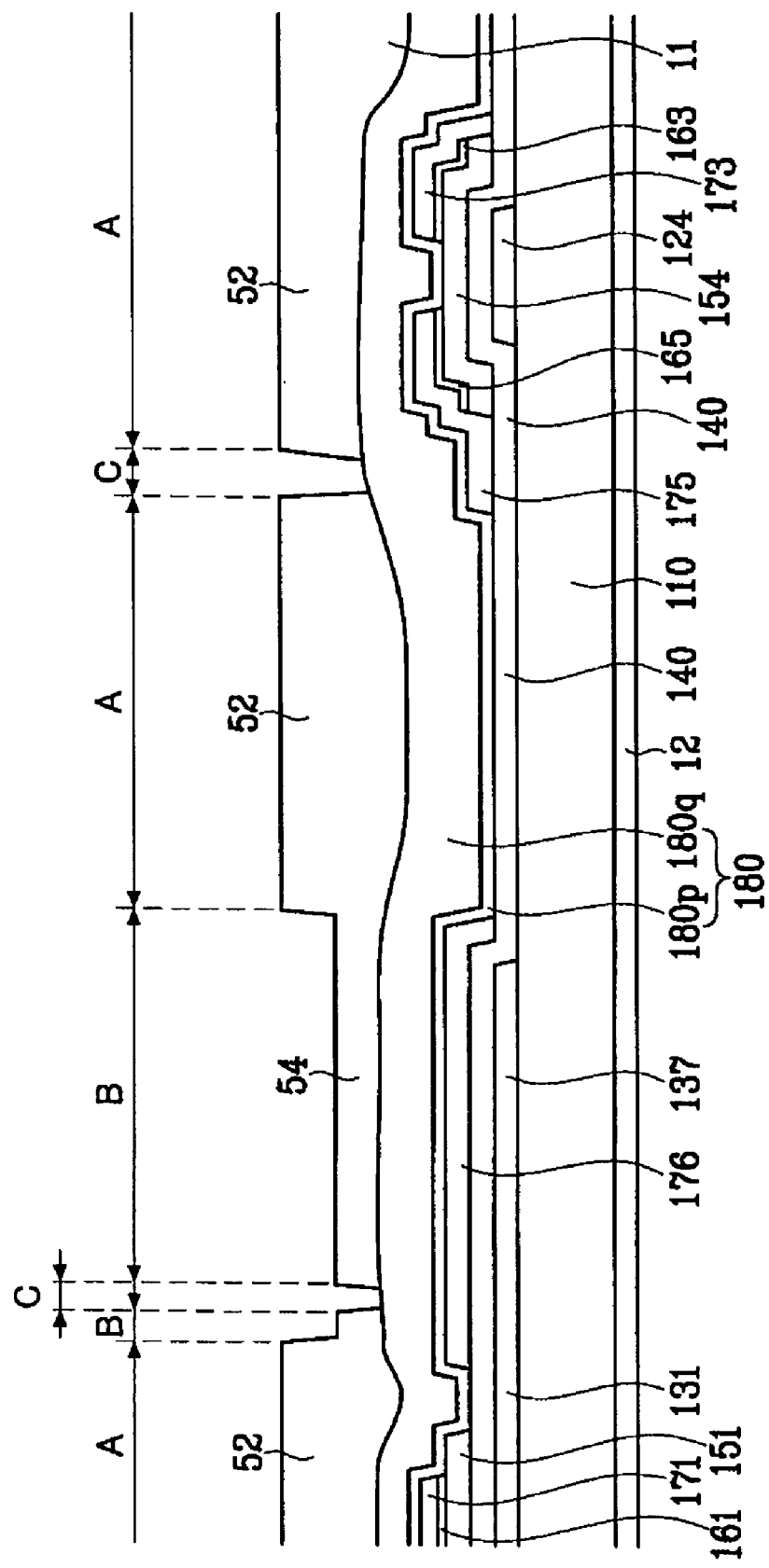
FIG. 19 is a sectional view of the TFT array panel shown in FIG. 18A taken along line XVIIIB-XVIIIB' in the intermediate step following the step shown in FIG. 18B.

Referring to FIG. 19, a lower film 180p and an upper film 180q are deposited and a photoresist masking member, including thick portions 52 disposed on areas A and thin portions 54 on areas B, is formed on the upper film 180q. Areas C have no photoresist. The position-dependent thickness of the masking member 52 and 54 can be obtained by techniques previously described with reference to FIG. 6 and FIG. 7.

Exposed portions of upper and lower films 180q and 180p and gate insulating layer 140 in the areas C are removed to form a plurality of contact holes 181, 182, 185 and 186. By this step, only upper portions of contact holes 181, 182, 185 and 186 may be made.

Figure 20A:
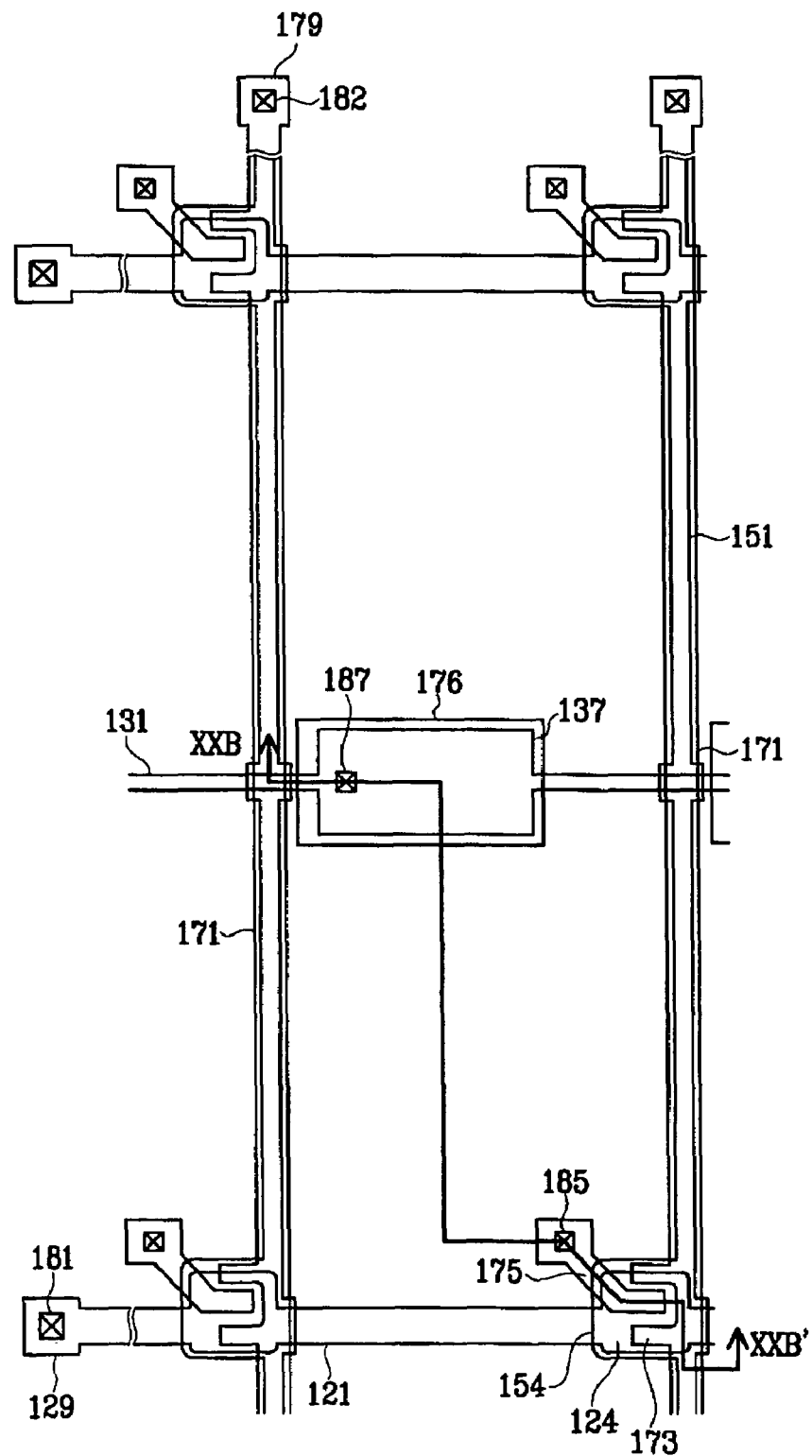
Figure 20B:
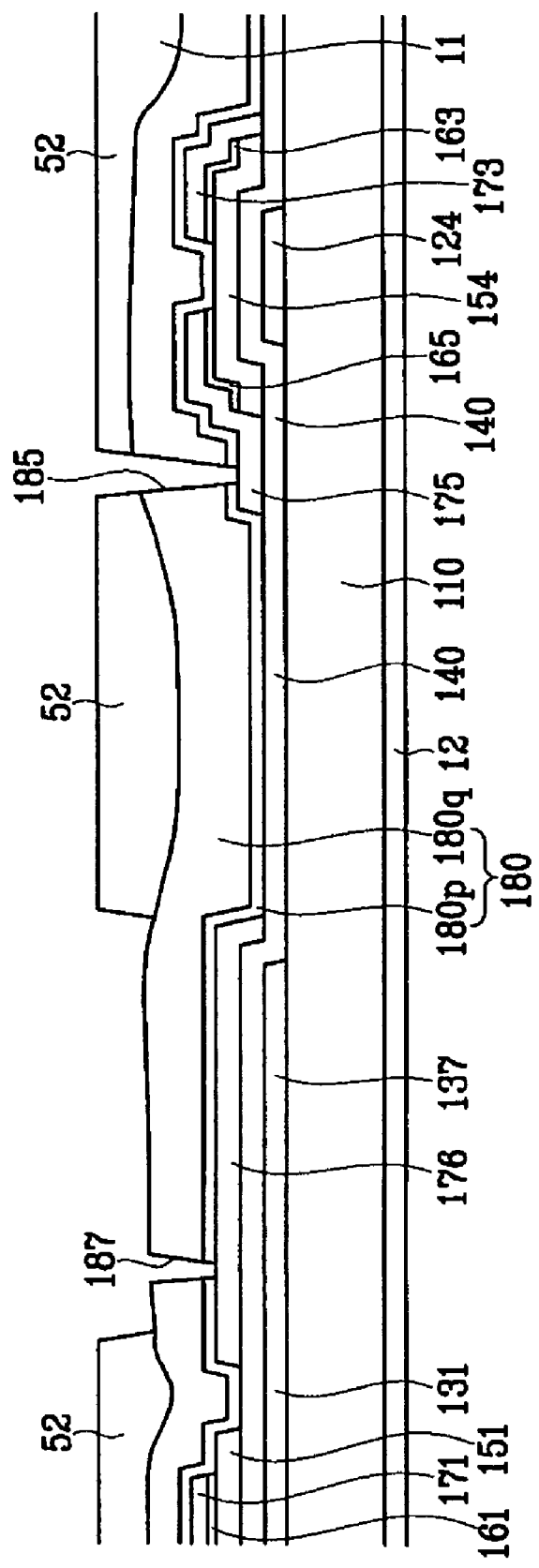

Next, referring to FIG. 20A and FIG. 20B, masking members 52 and 54 are subjected to be thickness reduction by ashing, for example, until thin portions 54 are removed to expose the surface of upper film 180q.

Figure 21:
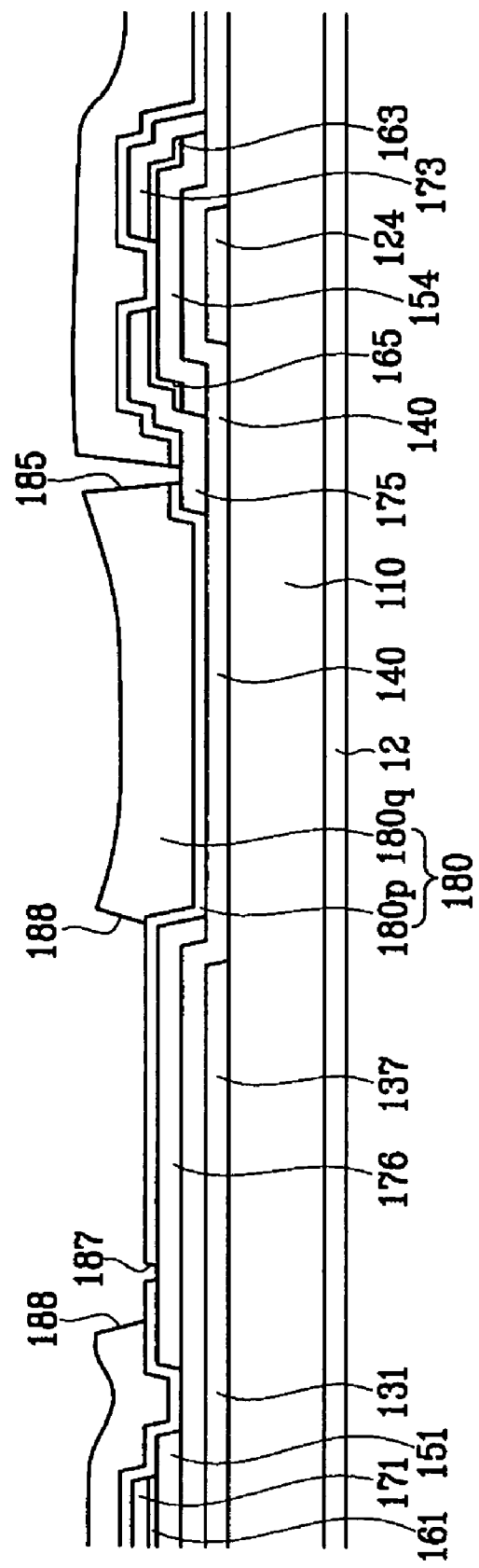
FIG. 21 is a sectional view of the TFT array panel shown in FIG. 20A taken along line XXB-XXB' in the step following the intermediate step shown in FIG. 20B.

Looking at FIG. 21, the exposed portions of upper film 180q are removed to form a plurality of openings 188. When contact holes 181, 182, 185 and 186 are not completed, unremoved portions of the layers 180q, 180p and 140 are removed in this step.

Finally, an ITO or IZO layer having a thickness of about 500-1,500 Å is deposited by sputtering, for example, and patterned by lithography and etching to form a plurality of pixel electrodes 190 and a plurality of contact assistants 81 and 82 as shown in FIG. 12 through FIG. 15.

Figure 22:
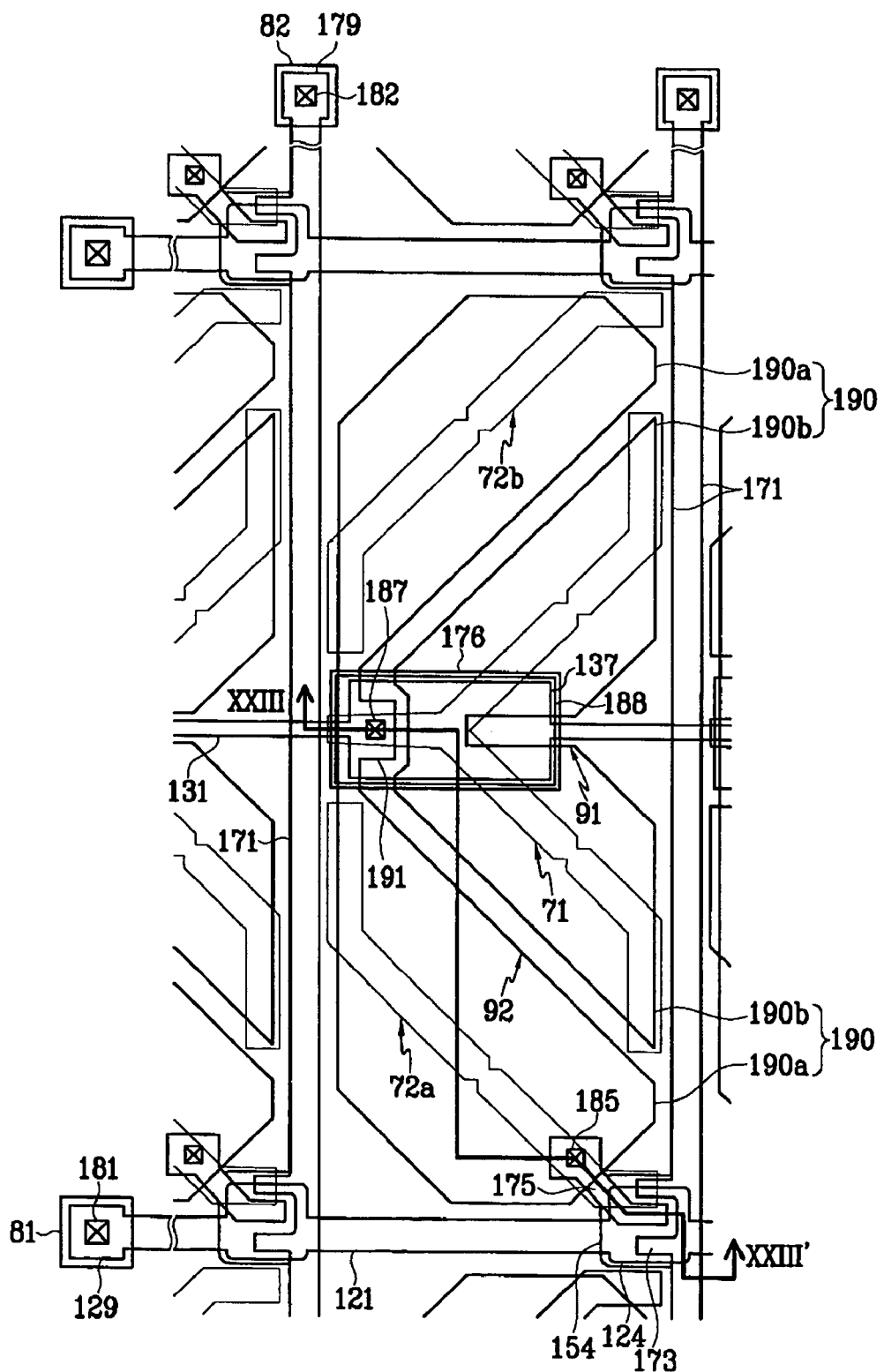
FIG. 22 is a layout view of an LCD according to another embodiment of the present invention.
Figure 23:
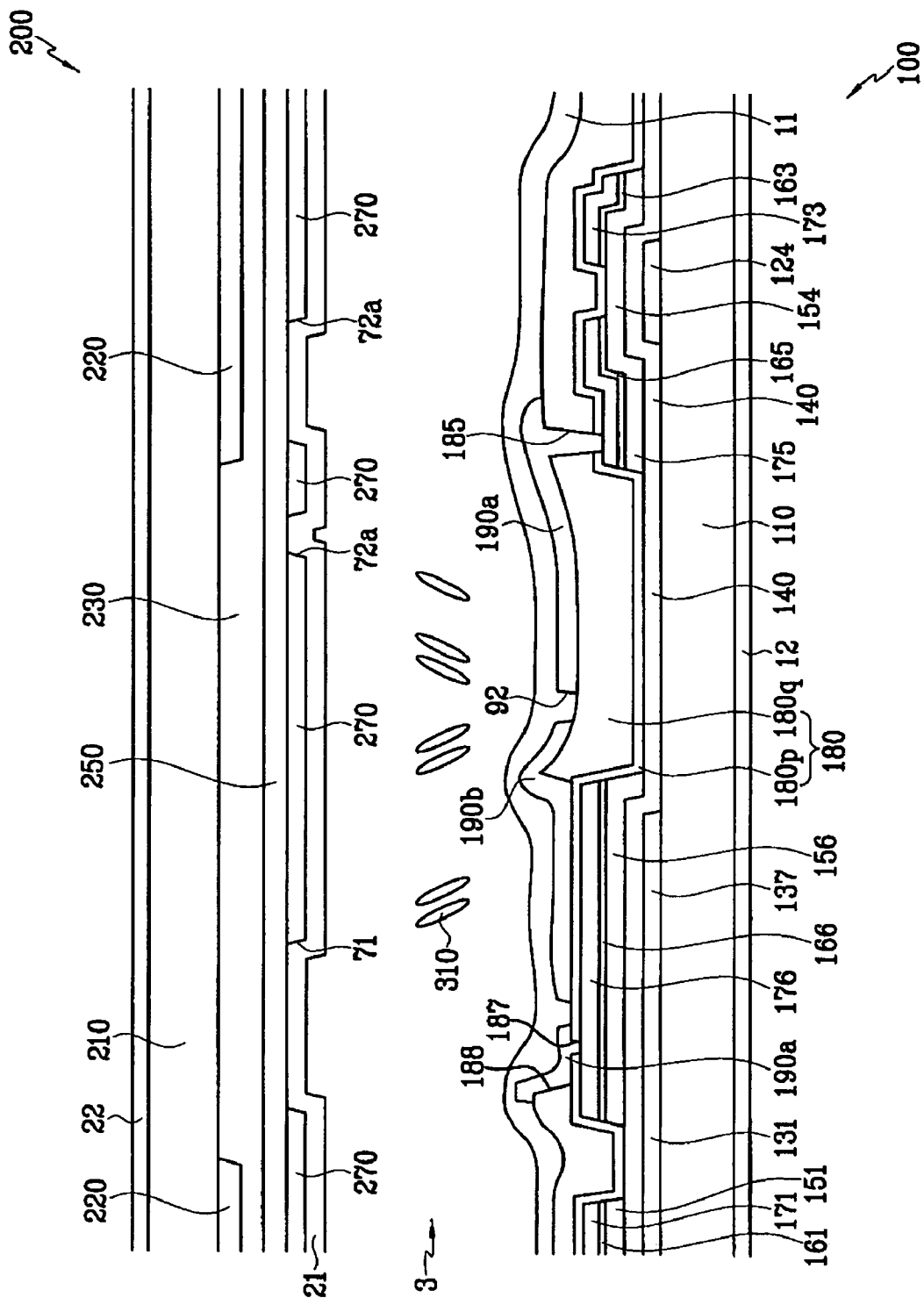
FIG. 23 is a sectional view of the LCD shown in FIG. 22 taken along line XXIII-XXIII'.

An LCD according to yet another embodiment of the present invention will be described in detail with reference to FIG. 22 and FIG. 23, having panels 100 and 200 of similar layer structure as the previously described embodiment shown in FIG. 12 through FIG. 15.

Here semiconductor stripes 151 have almost the same planar shapes as the data lines 171 and the drain electrodes 175 as well as the underlying ohmic contacts 161 and 165. Semiconductor stripes 151, however, include some exposed portions that are not covered with data lines 171 and drain electrodes 175, like those portions located between source electrodes 173 and drain electrodes 175.

In addition, a plurality of semiconductor islands 156 and a plurality of ohmic contact islands 166 are formed under coupling electrodes 176.

The TFT array panel can be manufactured according to a simplified method that simultaneously forms data lines 171, drain electrodes 175, coupling electrodes 176, semiconductors 151 and 156, and ohmic contacts 161, 165, and 166 using one photolithography step.

An LCD according to yet another embodiment of the present invention will be described in detail with reference to FIG. 24, FIG. 25 and FIG. 26, wherein the layered structures of the panels 100 and 200 are almost the same as those of the previously described embodiments.

In the present embodiment, each of the outer subpixel electrodes 190a is divided into lower and upper portions 190a1 and 190a2 (referred to as lower and upper subpixel electrodes hereinafter) disposed opposite each other with respect to inner subpixel electrode 190b. That is, each cutout 92 includes two oblique portions 92a and 92b rectilinearly separating a pixel electrode 190. Therefore, cutout 92 has no longitudinal portion and there is no longitudinal portion connecting portions of outer subpixel electrode 190a.

Accordingly, inner subpixel electrode 190b extends to the left edge of the pixel electrode 190 to increase the aperture ratio.

Each of the capacitive electrodes 136 is disposed near a left edge of a pixel electrode 190 and elongated substantially parallel to data lines 171 to cover portions of lower and upper subpixel electrodes 190a1 and 190a2. Capacitive electrode 136 includes a projection 139 that may be exposed by contact hole 186 and connected to inner subpixel electrode 190b. Contact hole 186 is disposed on a straight line extending from cutout 91 that does not belong to an effective display area, thereby improving display characteristics.

Each of the coupling electrodes 176 overlaps capacitive electrode 136 and resembles the shape thereof, except for the projection 139. Each of the drain electrodes 175 further includes an interconnection 178 connecting expansion 177 and coupling electrode 176. Interconnection 178 obliquely extends along a cutout 72a to block the light leakage therethrough and to increase the aperture ratio.

Passivation layer 180 has pairs of contact holes 185a1 and 185a2 exposing both end portions of coupling electrode 176 such that lower and upper subpixel electrodes 190a1 and 190a2 are connected to coupling electrode 176 through contact holes 185a and 185b, respectively.

Figure 24:
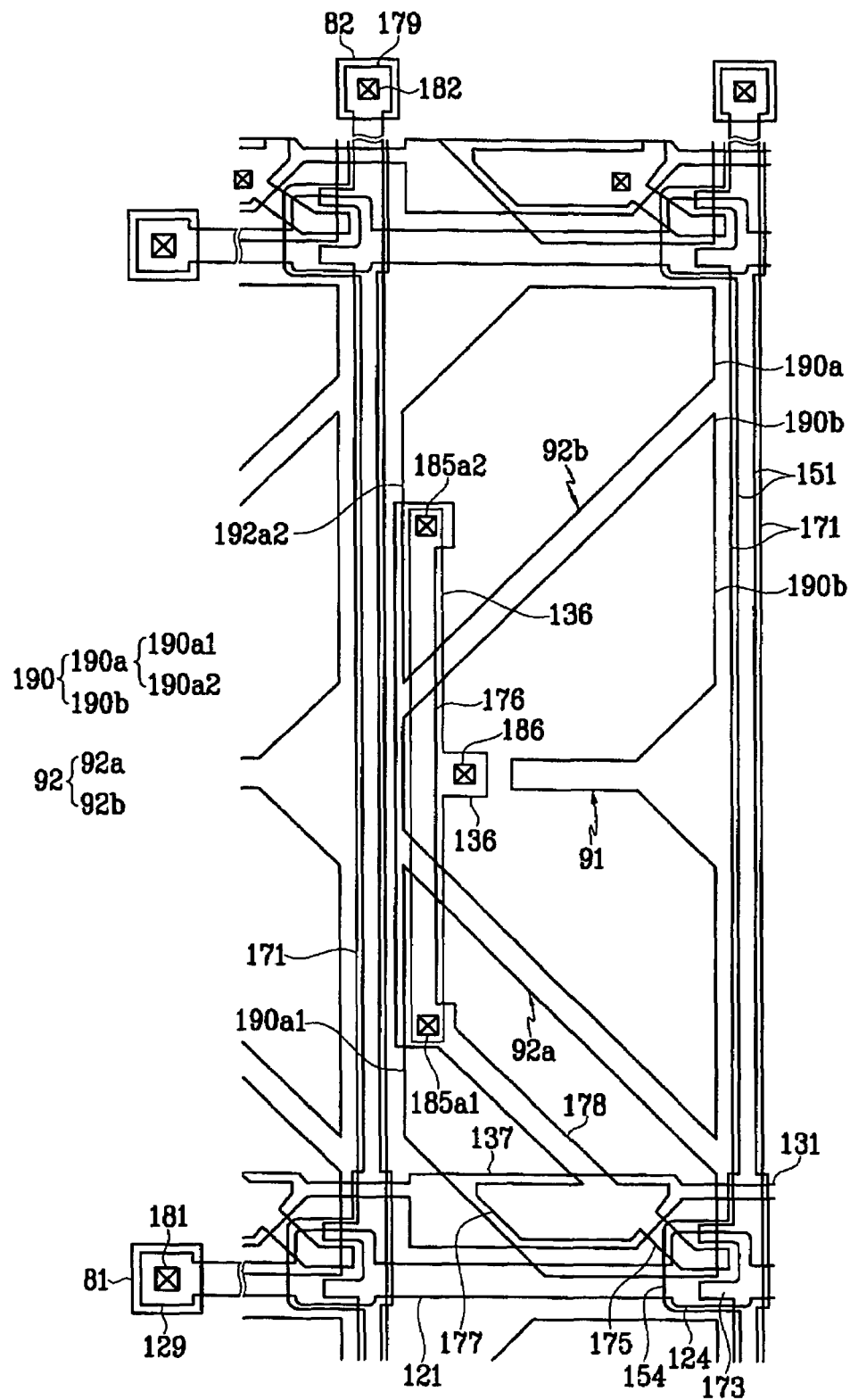
FIG. 24 is a layout view of a TFT array panel for an LCD according to another embodiment of the present invention.
Figure 25:
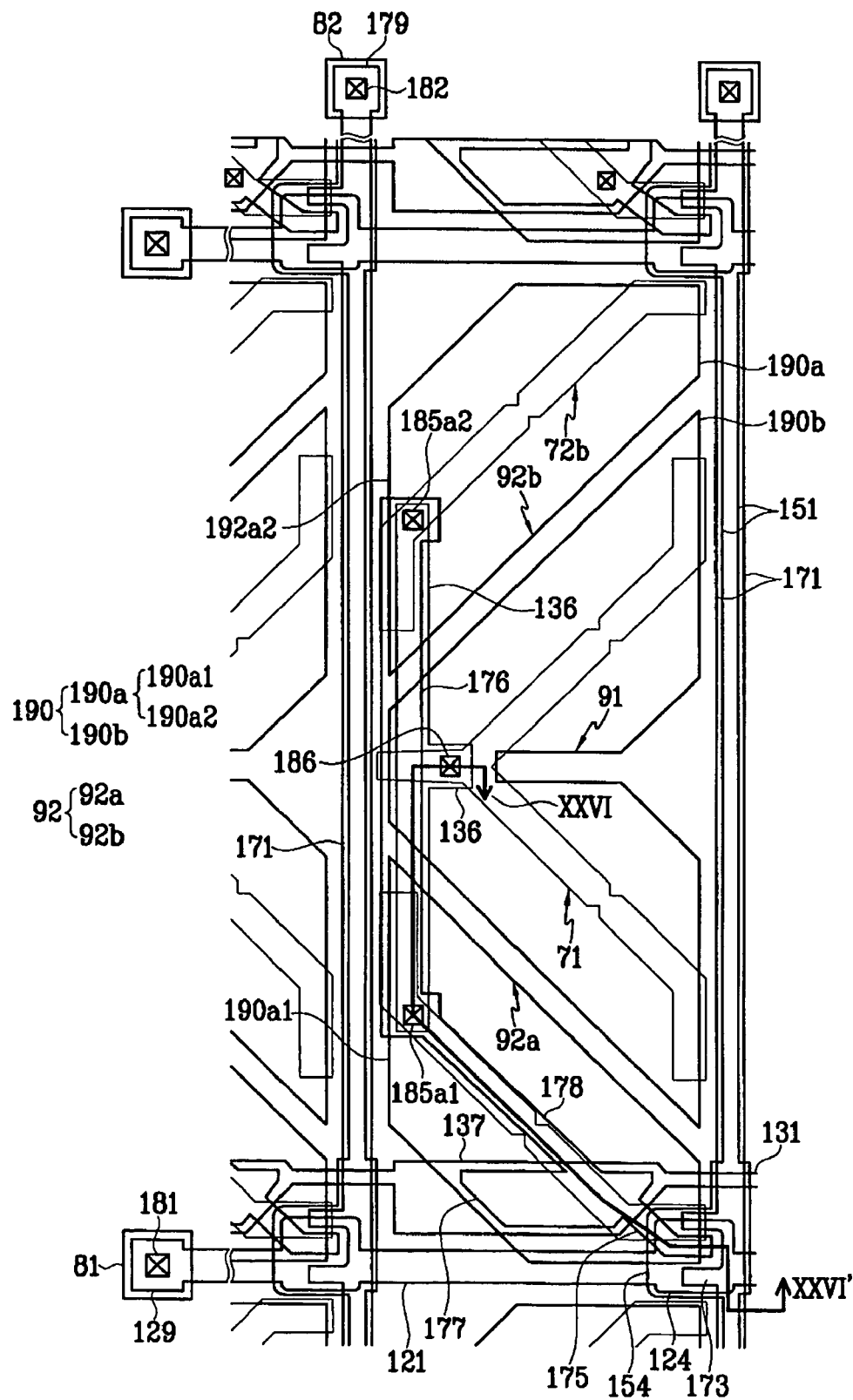
FIG. 25 is a layout view of an LCD including the TFT array panel shown in FIG. 24 and the common electrode panel shown in FIG. 2.
Figure 26:
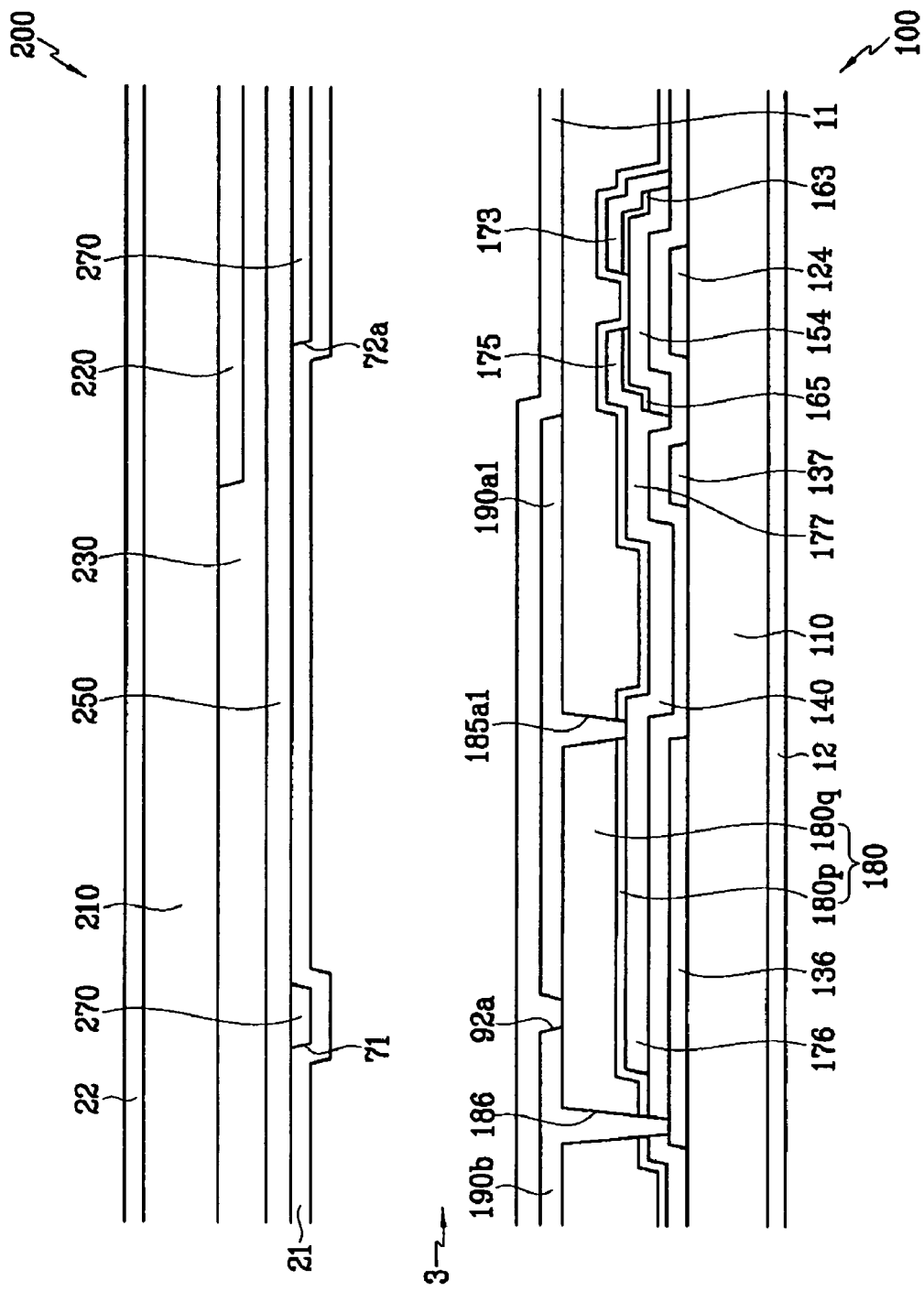
FIG. 26 is a sectional view of the LCD shown in FIG. 25 taken along line XXVI-XXVI'.

The aperture ratio of the LCD shown in FIG. 24 through FIG. 26 was calculated to be 4% to 5% greater than the LCD shown in FIG. 1 through FIG. 4.

Figure 27:
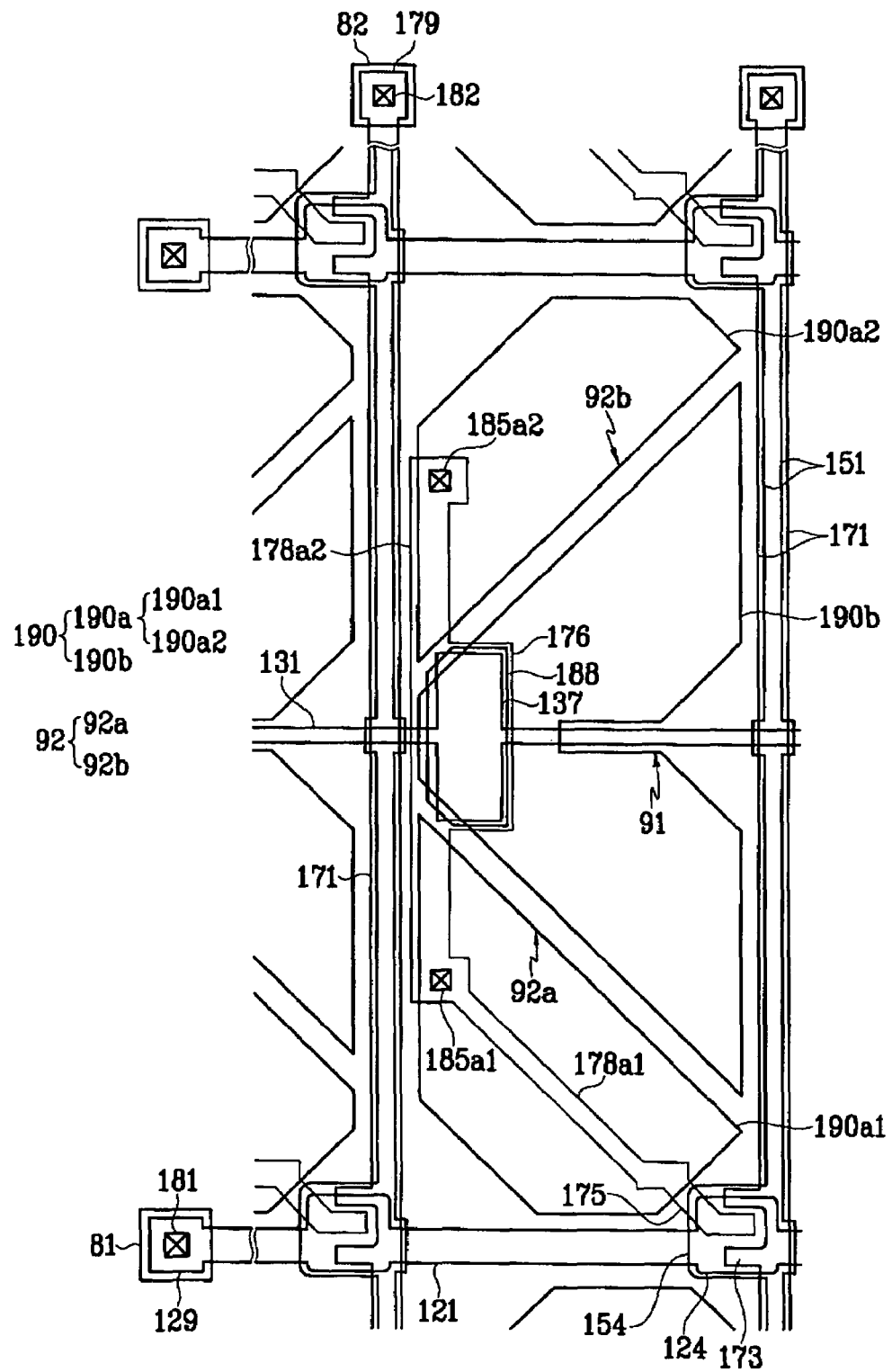
FIG. 27 is a layout view of a TFT array panel for an LCD according to another embodiment of the present invention.
Figure 28:
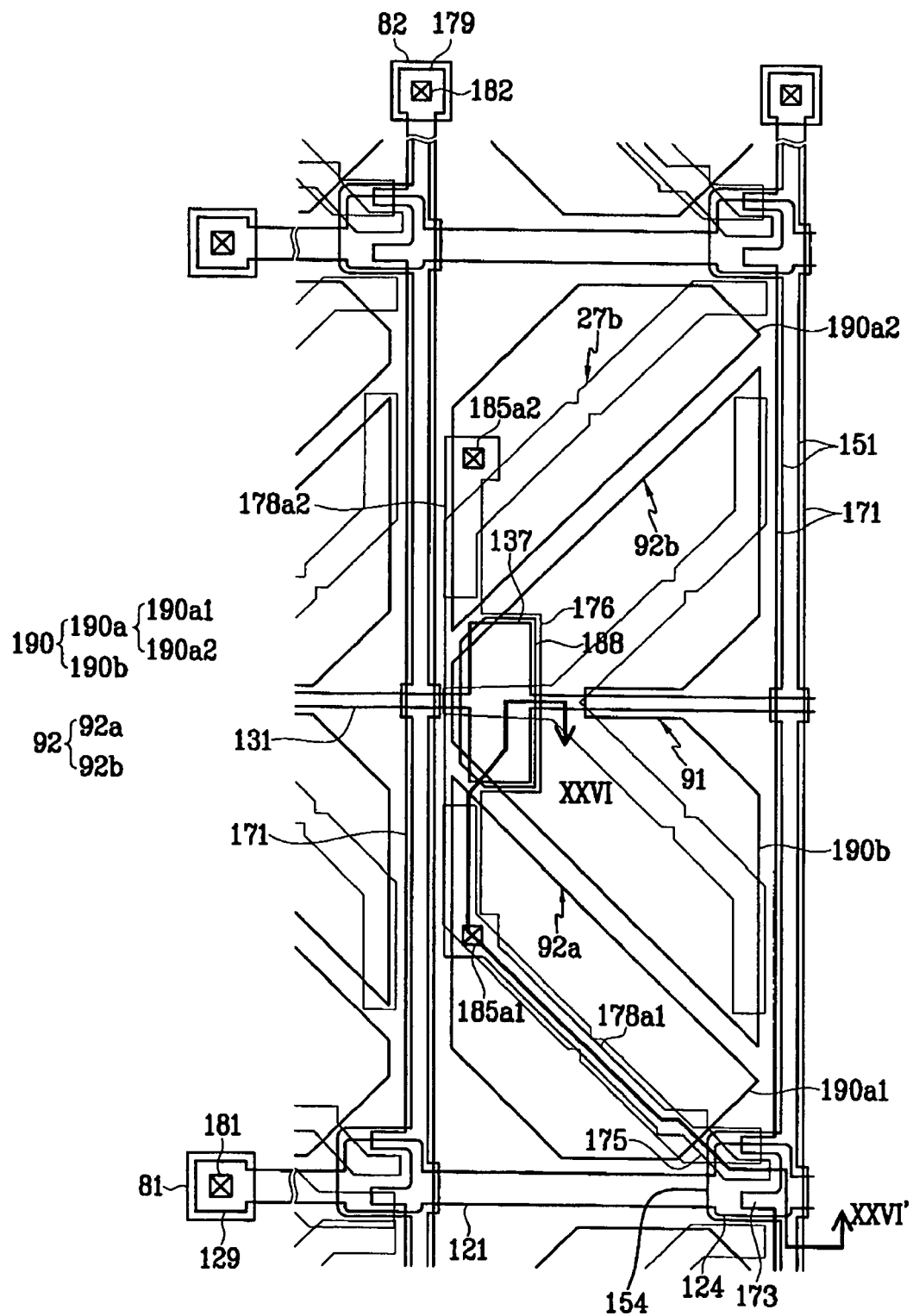
FIG. 28 is a layout view of an LCD including the TFT array panel shown in FIG. 27 and the common electrode panel shown in FIG. 2.
Figure 29:
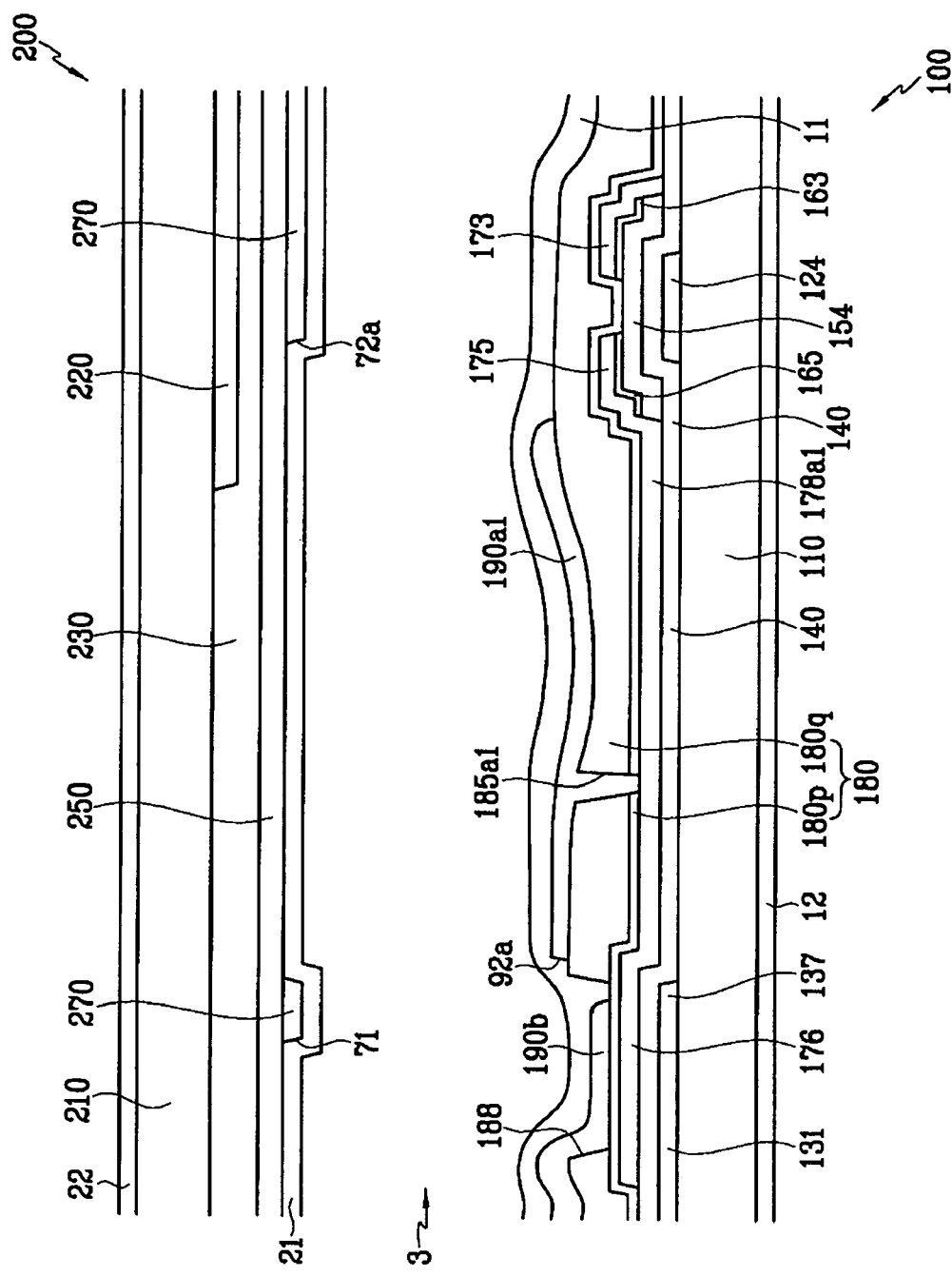
FIG. 29 is a sectional view of the LCD shown in FIG. 28 taken along line XXIX-XXIX'.

An LCD according to yet another embodiment of the present invention will be described in detail with reference to FIG. 27, FIG. 28 and FIG. 29, wherein the pixel is arranged similar to the pixel depicted in FIG. 24 through FIG. 26.

In this embodiment, however, each of the drain electrodes 175 further includes a lower interconnection 178a1 connecting coupling electrode 176 to drain electrode 175 and an is upper interconnection 178a2 extending from coupling electrode 176 to upper subpixel electrode 190a2. Lower interconnection 178a1 extends obliquely along a cutout 72a, thereby blocking the light leakage therethrough and thus increasing the aperture ratio. Lower interconnection 178a1 then turns upward to connect to coupling electrode 176.

Further, contact hole 185a1 exposing the lower interconnection 178a1 may be provided at a turning position of interconnection 178a1, and another contact hole 185a2 exposing the upper interconnection 178a2 is provided at an upper end thereof. Lower and upper subpixel electrodes 190a1 and 190a2 are connected to lower and the upper interconnections 178a1 and 178a2 through contact holes 185a1 and 185a2, respectively.

The aperture ratio of the LCD of the current embodiment was calculated to be approximately 2% to 4% greater than the aperture ratio of the LCD shown in FIG. 12 through FIG. 15.

The present invention can be employed in either twisted nematic (TN) mode LCD or in-plane switching mode LCD.

While the present invention has been described in detail with reference to a number of embodiments herein, those skilled in the art will appreciate that various modifications and substitutions can be made thereto without departing from the spirit and scope of the present invention as set forth in the appended claims.

What is claimed is:

1. A thin film transistor (TFT) array panel, comprising:
   a substrate;
   a first signal line formed on the substrate;
   a second signal line crossing the first signal line;
   a thin film transistor connected to the first signal line and the second signal line;
   a coupling electrode electrically connected to the thin film transistor;
   a pixel electrode including a first subpixel electrode, a second subpixel electrode and a third subpixel electrode separated from each other; and
   an insulating layer disposed between the coupling electrode and the pixel electrode and having a plurality of contact holes,
   wherein the first subpixel electrode and the second subpixel electrode electrically connected to the coupling electrode through the respective contact holes, and the third subpixel electrode capacitively coupled to the first subpixel electrode and the second subpixel electrode.

2. The thin film transistor array panel of claim 1, wherein the first subpixel electrode and the second subpixel electrode are disposed opposite each other with respect to the third subpixel electrode.

3. The thin film transistor array panel of claim 1, wherein the coupling electrode is capacitively coupled to the third subpixel electrode.

4. The thin film transistor array panel of claim 3, further comprising a storage electrode underlying at least one of the first subpixel electrode, the second subpixel electrode and the coupling electrode.

5. The thin film transistor array panel of claim 3, wherein the coupling electrode underlies the third subpixel electrode.

6. The thin film transistor array panel of claim 5, wherein a portion of the insulating layer disposed between the coupling electrode and the third subpixel electrode and is thinner than other portions of the insulating layer.

7. The thin film transistor array panel of claim 6, wherein the insulating layer comprises an inorganic film and an organic film.

8. The thin film transistor array panel of claim 7, wherein the organic film has an opening disposed on the coupling electrode, wherein the coupling electrode coupled to the third subpixel electrode via the opening in the organic film to form a coupling capacitor.

9. The thin film transistor array panel of claim 5, further comprising a capacitive electrode electrically connected to the third subpixel electrode and underlying the coupling electrode.

10. The thin film transistor array panel of claim 9, further comprising:
    a gate insulating layer disposed between the first signal line and the second signal line, wherein the gate insulating layer also is disposed between the capacitive electrode and the coupling electrode.

11. The thin film transistor array panel of claim 10, wherein the gate insulating layer comprises an inorganic film and an organic film disposed on the inorganic film.

12. The thin film transistor array panel of claim 3, further comprising a capacitive electrode electrically connected to the third subpixel electrode and underlying the coupling electrode.

13. The thin film transistor array panel of claim 12, further comprising:
    a gate insulating layer disposed between the fist signal line and the second signal line, wherein the gate insulating layer also is disposed between the capacitive electrode and the coupling electrode.

14. The thin film transistor array panel of claim 3, wherein the coupling electrode extends from the thin film transistor.

15. The thin film transistor array panel of claim 1, further comprising a capacitive electrode electrically connected to the third subpixel electrode and capacitively coupled to the first subpixel electrode or the second subpixel electrode.

16. The thin film transistor array panel of claim 1, further comprising a partitioning member partitioning the pixel electrode into the first subpixel electrode, the second subpixel electrode, and the third subpixel electrode.

17. A liquid crystal display panel, comprising:
    a common electrode panel including a common electrode;
    a thin film transistor (TFT) array panel disposed opposite the common electrode, the TFT array panel comprising:
    a substrate,
    a first signal line formed on the substrate,
    a second signal line crossing the first signal line,
    a TFT coupled to the first signal line and the second signal line,
    a coupling electrode electrically connected to the TFT,
    an insulating layer formed on the TFT and the coupling electrode, and having a plurality of contact holes, and
    a pixel electrode including a first electrode portion and a second electrode portion separated from each other and electrically connected to the coupling electrode through the respective contact holes, and a third electrode portion capacitively coupled to the first and second electrode portions;

a liquid crystal (LC) layer disposed between the common electrode panel and the TFT array panel; and wherein the pixel electrode comprises:

a first subpixel including the first electrode portion and the second electrode portion to which a first voltage is applied, and and a second subpixel including the third electrode portion to which a second voltage is applied.

18. The liquid crystal display panel of claim 17, wherein: the first subpixel includes a first LC capacitor and a storage capacitor; and the second subpixel includes a second LC capacitor and a coupling capacitor.

19. The liquid crystal display panel of claim 18, wherein:

the first LC capacitor comprises a first terminal that includes the first electrode and second electrode portion, a second terminal that includes a first overlapping portion of the common electrode, and a portion of LC layer disposed between the first terminal and the second terminal as a dielectric; and the second LC capacitor comprises a first terminal that includes the third electrode portion, a second terminal that includes a second overlapping portion of the common electrode, and a portion of LC layer disposed between the first terminal and the second terminal as a dielectric.

20. The liquid crystal display panel of claim 17, wherein the first voltage is greater than the second voltage.

21. The liquid crystal display panel of claim 20, wherein the second voltage is approximately 60% to 80% of the first voltage.

22. The liquid crystal display panel of claim 19, wherein:

the storage capacitor comprises a first terminal including an expansion of a drain electrode of the TFT, a second terminal including a storage electrode disposed on the substrate, and a portion of a gate insulating layer disposed between the first terminal and the second terminal as dielectric; and the coupling capacitor comprises a first terminal including the third electrode portion and a capacitive electrode disposed on the substrate, a second terminal including a coupling electrode electrically connected to the expansion of the drain electrode, and portions of the gate insulating layer and a passivation layer disposed between the first terminal and the second terminal as a dielectric.

23. The liquid crystal display panel of claim 22, wherein a ratio of the first voltage to the second voltage is adjusted by varying a capacitance of the coupling capacitor, and the capacitance of the coupling capacitor is varied by changing a position of the coupling electrode with respect to the first electrode portion and second electrode portion.

* * * * *